US012749069B2

(12) United States Patent
Landerholm et al.

(10) Patent No.: US 12,749,069 B2
(45) Date of Patent: Sep. 29, 2026

(54) PAYMENT CARD DATA PREPARATION AND PERSONALIZATION PLATFORM

(71) Applicant: Entrust Corporation, Shakopee, MN (US)

(72) Inventors: Kent Landerholm, Apple Valley, MN (US); Terry Allen Edwards, Shakopee, MN (US); Jan Charles Pierce, Chaska, MN (US)

(73) Assignee: Entrust Corporation, Shakopee, MN (US)

( * ) Notice: Subject to any disclaimer, the term of this patent is extended or adjusted under 35 U.S.C. 154(b) by 105 days.

(21) Appl. No.: 18/672,441

(22) Filed: May 23, 2024

(65) Prior Publication Data

US 2024/0394688 A1 Nov. 28, 2024

Related U.S. Application Data

(60) Provisional application No. 63/503,877, filed on May 23, 2023.

(51) Int. Cl.
*G06Q 20/34* (2012.01)

(52) U.S. Cl.
CPC .................................. *G06Q 20/355* (2013.01)

(58) Field of Classification Search
CPC ......................... G06Q 20/355; G06Q 20/3558
See application file for complete search history.

(56) References Cited

U.S. PATENT DOCUMENTS 10,255,596 B2 * 4/2019 Cowen ................. G06Q 20/105
11,127,017 B2 * 9/2021 Phillips .................. G06Q 20/34
12,008,562 B2 * 6/2024 Pendse ............... G06Q 20/3672
2004/0210566 A1 10/2004 Smith et al.
2008/0015979 A1 * 1/2008 Bentley .................. G06Q 40/03 705/38
2016/0321658 A1 * 11/2016 Unser .................. G06Q 20/405
2018/0285877 A1 * 10/2018 Bracconeri .......... G06Q 20/405
2018/0374139 A1 * 12/2018 Shrivastava ....... G06Q 30/0631
2019/0354959 A1 * 11/2019 Phillips ................ G06Q 20/341
2021/0090070 A1 * 3/2021 Hay ....................... G06F 3/0604

(Continued)

FOREIGN PATENT DOCUMENTS

WO WO-2016145436 A1 * 9/2016 ........... G06Q 20/385

OTHER PUBLICATIONS

Shang, S.C., and Chiu, S.L., "Leveraging Smart Technology for User Experience Personalization—A Comparative Study of Innovative Payment Systems . . . " PAJAIS, vol. 14, Iss 1 (2022) (Year: 2022).*

(Continued)

*Primary Examiner* — Daniel S Felten
(74) *Attorney, Agent, or Firm* — Merchant & Gould P.C.

(57) ABSTRACT

A payment card data preparation and personalization platform provides a card production environment that provides a production context in which card products and card configurations are able to be defined, for example using various guided user interfaces. Furthermore, the platform implements a data preparation engine and a personalization engine. User interfaces guide definition of payment card products, and aspects of data preparation and personalization are independently executable. A product wizard assists with guided definition of a payment card product to be used within the platform.

18 Claims, 24 Drawing Sheets

(56) References Cited

U.S. PATENT DOCUMENTS

| | | | | |
|---|---|---|---|---|
| 2021/0182835 | A1* | 6/2021 | Kurylko | G06Q 20/3552 |
| 2023/0053007 | A1* | 2/2023 | Wall | G06Q 20/4016 |
| 2023/0419300 | A1* | 12/2023 | Bruley | G06Q 20/34 |

OTHER PUBLICATIONS

Sharma, V., "Using Artificial Intelligence for a Personalized Payment Experience" International Journal of Computer Techniques—vol. 12 Issue 2, 2025 (Year: 2025).*

International Search Report and Written Opinion issued in PCT/US2024/030817, completed Mar. 5, 2025 and mailed Mar. 19, 2025.

* cited by examiner

100

200

600

| | | | | | | | |
|---|---|---|---|---|---|---|---|
| Tag | Length | Tag | Length | Value | Tag | Length | Value |
| Tag | Length | Tag | Length | Value | Tag | Length | Value |
| Tag | Length | Tag | Length | Value | Tag | Length | Value |

700

FIG. 7

PAYMENT CARD DATA PREPARATION AND PERSONALIZATION PLATFORM

CROSS-REFERENCE TO RELATED APPLICATIONS

The present application claims priority from U.S. Provisional Patent Application No. 63/503,877, filed on May 23, 2024, the disclosure of which is hereby incorporated by reference in its entirety.

BACKGROUND

Payment cards, including both physical and virtual payment cards, require configuration prior to being issued to individual consumer users. This configuration typically involves associating the payment card with its specific type (e.g., debit or credit), and defining the payment network with which the payment card will be used, as well as specific, detailed settings for its use with that payment network. Payment cards are often implemented, in physical form, using smart cards (e.g., either a physical chip or a virtual chip implemented on a mobile device), which may be configured according to a standard set of settings. One such configuration standard is the EMV (Europay, Mastercard, and Visa) standard.

Existing card issuance systems generally involve significant setup and programming to appropriately program cards having EMV chips. For example, a payment profile of a payment processor (e.g., Mastercard, Visa) may be added to an issuer profile (e.g., a financial institution), and combined with cardholder data, security information, and the like, to form the dataset that is maintained on the EMV chip. This setup process is both time consuming and requires specialized personnel. Furthermore, this setup and programming generally lacks significant flexibility regarding the manner of card preparation and personalization.

SUMMARY

Generally, the present application is directed to a payment card data preparation and personalization platform. The platform provides a card production environment that provides a production context in which card products and card configurations are able to be defined, for example using various guided user interfaces. Furthermore, the platform implements a data preparation engine and a separately executable personalization engine.

In example aspects, the data preparation engine may be executed to generate a prepared card product, which generally corresponds to card data but may have some data object values that remain unresolved. The personalization engine may be executed to receive the prepared card product and a card configuration, resolve remaining unresolved data object values, and generate a personalized payment card. The personalized payment card may have data object values fully resolved. In some further aspects, a product wizard user interface may present sequentially-selectable guided user template options that guide a user through creation of a card product definition that may be provided to the data preparation engine.

In one particular aspect, a payment card platform includes a card production environment hosted on a computing platform comprising a processor and a memory. The memory stores instructions which, when executed, provide a production context, a data preparation engine, and a data personalization engine. The production context is useable to define one or more payment card products and one or more card configurations. The data preparation engine is configured to cardholder data, and configuration settings and a card product definition from the production context, the data preparation engine being configured to execute a plurality of predefined rules specified by the card product to generate a prepared card product. The personalization engine is separately executable from the data preparation engine, the data personalization engine being configured to receive a prepared card product and a card configuration from the production context and generate one or more personalized payment cards.

In a second aspect, a method of producing payment cards within a card production environment is disclosed. The method includes receiving a card product definition at a production context within the card production environment, the card production environment hosting a user interface useable to create a payment card profile and the card product definition. The method further includes defining a mode of operation for the production context within the card production environment, the mode of operation being selected from among a data preparation mode, a personalization mode, and a one-step (data preparation and personalization) mode. The method includes performing at least one of a data preparation process or a card personalization process based on the mode of operation. The data preparation process includes receiving cardholder data, and configuration settings and a card product definition from the production context; and executing a plurality of predefined rules specified by the card product to generate a prepared card product. The card personalization process includes receiving a prepared card product and a card configuration from the production context; and generating one or more personalized payment cards.

In a third aspect, a payment card data preparation system includes a product wizard hosted on a computing platform comprising a processor and a memory. The product wizard includes a user interface useable to create a card product definition via a plurality of sequentially-selectable guided user template options. The payment card data preparation system further includes a card production environment hosted on the computing platform. The card production environment includes a production context useable to define one or more payment card profiles and one or more card products, the production context receiving the card product definition from the product wizard. The card production environment further includes a data preparation engine configured to receive cardholder data, and configuration settings and the card product definition from the production context, the data preparation engine being configured to execute a plurality of predefined rules specified by the card product to generate a prepared card product. The card production environment further includes a data personalization engine configured to receive a prepared card product and a card configuration from the production context and generate one or more personalized payment cards. The data preparation engine is separately selectable and executable from the data personalization engine to generate one or more prepared card products. The card production environment hosts a user interface useable to define the one or more card configurations and the one or more card products.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIG. 7 is a schematic illustration of a Data Generation and Initialization (DGI) layout, according to an example embodiment.

DETAILED DESCRIPTION

As briefly described above, embodiments of the present invention are directed to a payment card data preparation and personalization platform. The platform provides a card production environment that provides a production context in which payment card products and card configurations are able to be defined, for example using various guided user interfaces. Furthermore, the platform implements a data preparation engine and a separately executable personalization engine.

In example aspects, the data preparation engine may be executed to generate a prepared card product, which generally corresponds to card data but may have some data object values that remains unresolved. The personalization engine may be executed to receive the prepared card product and a card configuration, and generate a personalized payment card. The personalized payment card may have data object values fully resolved. In some further aspects, a product wizard user interface may present sequentially-selectable guided user template options that guide a user through creation of a card product definition that may be provided to the data preparation engine.

Figure 1:
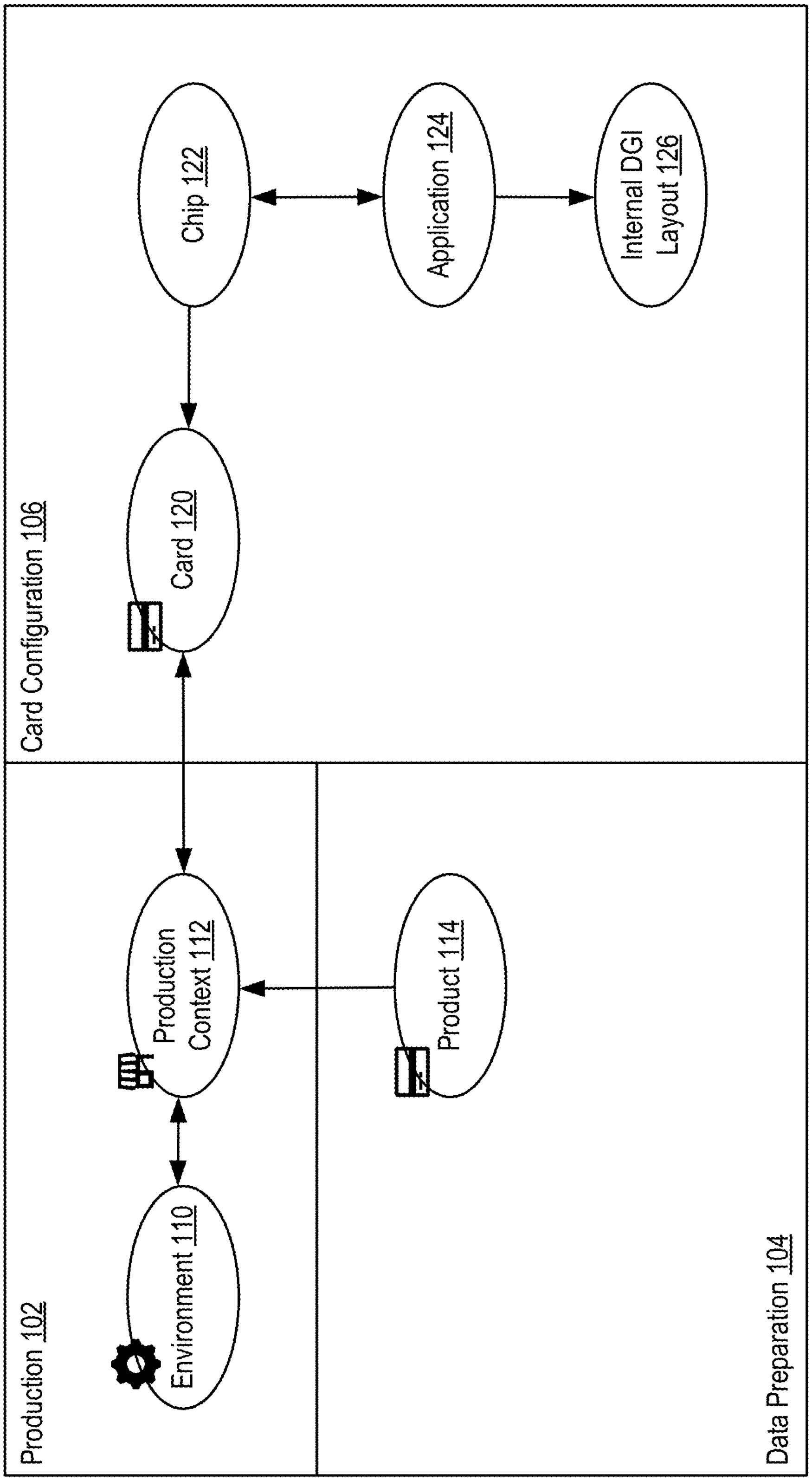
FIG. 1 illustrates an example payment card data preparation system, according to an example embodiment of the present disclosure.

Referring to FIG. 1, an example payment card data preparation system 100 is illustrated, according to an example embodiment. The payment card data preparation system 100 can include a production environment 102, a data preparation environment 104, and a card configuration environment 106. The payment card data preparation system 100 may be executable on a computing platform, for example across a plurality of computing systems, each of which includes a processor and memory subsystem. Example hardware usable to implement a payment card data preparation system 100 is described further below.

In the example shown, the production environment 102 includes a definition of a card production environment 110, which is linked to a production context 112. The card production environment 110 may define the type of card to be created (e.g., an EMV card, an identity card, and the like), and describes the environment in which the production context is used. The card production environment 110 may include a cryptographic token, one or more transport keys, a personalized error identifier, and a mode classifier usable by a user to define a specific mode of use of the payment card data preparation system 100, examples of which are provided below.

In the example shown, the production context 112 provides an association between a product with one or more cards, as well as a list of bank identifiers and a card management key. Other data may be stored in association within the production context 112 as well.

Within the data preparation environment 104, a product definition 114 may be maintained. The product definition 114 includes, in the example shown, a data object table including one or more rules for resolving values, as well as terminal DGI layouts. In other words, the product definition 114 defines a structure of data to be stored within a payment card.

In the example shown, the production context 112 receives data from the card production environment 110 and the product definition 114, to perform the association previously mentioned. The production context 112 is also in communication with a card configuration 120, maintained within the card configuration environment 106. The card configuration 120 specifies any card product lifecycle (CPLC) data, as well as a card key and chip format of the card. The card configuration inherits other defined data objects, including a chip definition 122, application definition 124, and DGI layout 126.

In the example shown, the chip definition 122 includes chip information, such as an authentication method of an EMV chip, card management information, APDU handling information, and one or more applications as defined in the application definition. The application definition 124 includes chip application information, such as application identifiers, installation parameters, and an internal DGI layout. The internal DGI layout 126 defines application-specific DGIs for a chip.

Referring to FIG. 1 generally, within the context of the card data preparation system 100, to prepare payment cards for issuance, generally speaking, an integrated data preparation and personalization process is performed to integrate the DGI layouts into applications and onto chips for inclusion on a card. The card information, then aggregated, may be associated with issuer information at the production context, based on the environment and product that are defined (e.g., issuer and payment network specific information). Payment card data preparation in particular involves the initial setup and processing of data related to the cardholder's account. This includes creating the cardholder's account record, generating a unique card number and expiration date, and linking the card to the appropriate account information. The goal of payment card data preparation is to ensure that the card is properly authorized for use and can be activated by the cardholder. Personalization, comparatively, refers to the process of physically customizing the payment card with specific information unique to the cardholder, such as the cardholder's name, card number, and expiration date. This can include, for example, the physical creation of a card, or the programming of the data generated as part of the data preparation process onto the card (e.g., on an EMV chip installed on the card). The goal of personalization is to create a physical card that is unique to the cardholder and that can be used for transactions.

In typical card generation processes, card data preparation and personalization occur in an intertwined process, and require significant prior knowledge of a form of a payment card to appropriately format data used to program such a card. This leads to an error-prone, specialized process that is highly custom to each card created. It also leads to rigid deployment processes in which the data preparation and personalization processes are typically performed in a concurrent and intertwined manner.

In example aspects of the present disclosure, a structured set of definitions of a product and product context, alongside definitions of a card and its constituent components (a chip, application, and DGI layouts) allows for individualized, modular data preparation that is guided through a series of user interfaces. The user interfaces provided guided version control and linking of data elements to simplify the card data preparation and personalization processes, and to make card data preparation and personalization independently selectable.

In accordance with example aspects, the platform simplifies creation of new data preparation components (e.g., card, chip, application definitions, and the like), allows a user to view the results of data preparation without requiring complete personalization of cards, and also allows for simulation of personalization for inspection. Users may verify all data objects during the process via a user interface available via the platform to ensure data correctness and consistency. Furthermore, underlying edits to selected configurations (e.g., specific combinations of card, chip, application, and/or context information) may be treated as immutable, such that updated configurations are created as new versions, rather than allowing edits to existing configurations. This improves traceability, data security, and version control.

In addition, in certain aspects, other user interfaces may be made available, for example a wizard interface that assists a user with the product definition by presenting selectable templates in sequence for guiding a user through environment and card definition features. As a user selects specific environment and card features, available/compatible subsidiary feature options are presented, such that a user is guided toward creation of a dataset including rules for resolving data values that is available for use and would be functional on a personalized/issued card. Such generated datasets may be imported into the card data management platform described herein, and may be used in configuring one or more card products for personalization and issuance.

Figure 2:
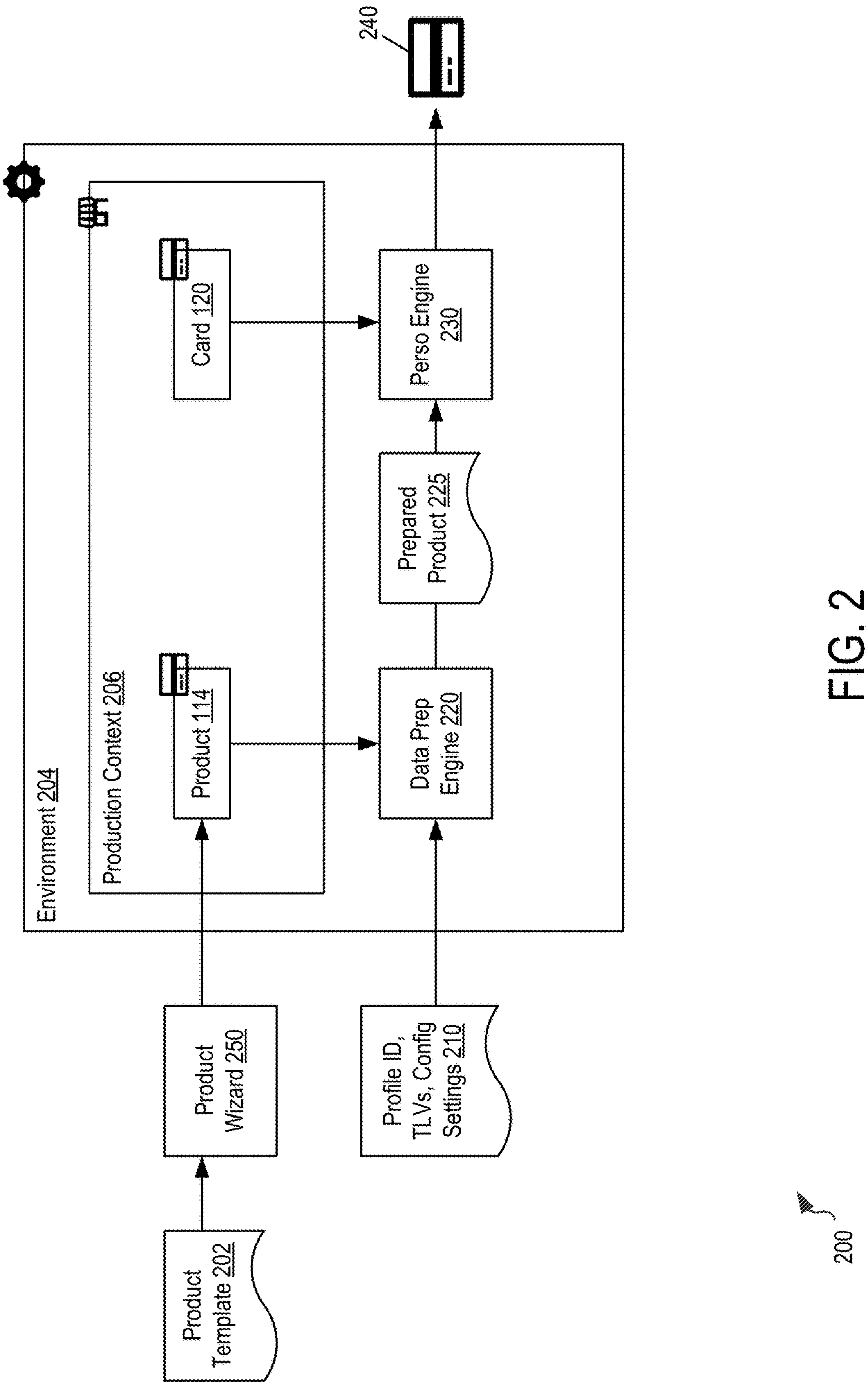
FIG. 2 illustrates an example payment card platform usable within a payment card data preparation system for data preparation and personalization, according to an example embodiment.
Figure 3:
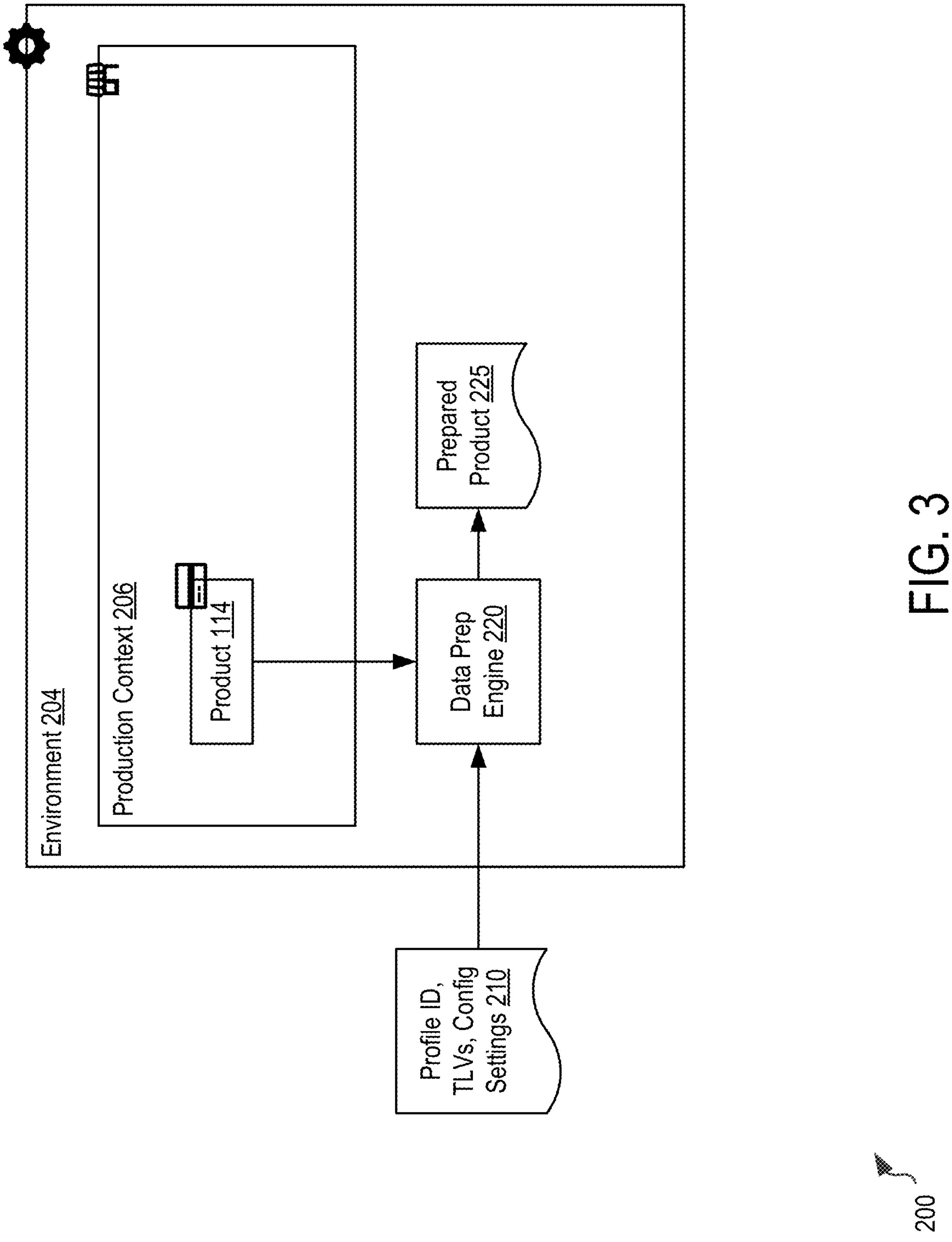
FIG. 3 illustrates an example payment card platform usable within a payment card data preparation system for data preparation alone, according to an example embodiment.
Figure 4:
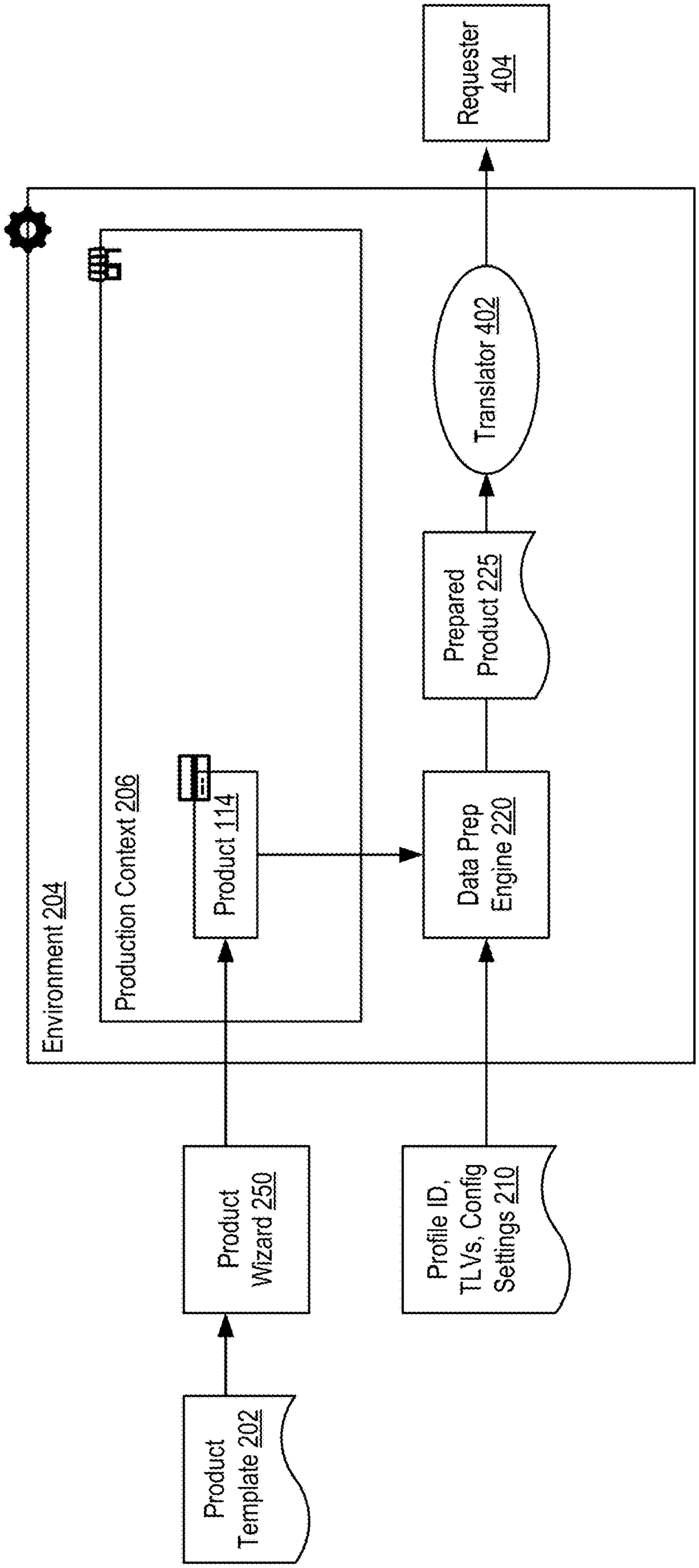
FIG. 4 illustrates a functional diagram of data inputs to a data preparation engine usable within the payment card platforms described herein.

Referring now to FIGS. 2-4, example implementations of a payment card platform 200 are shown. In particular, FIG. 2 illustrates use of a payment card platform 200 within a payment card data preparation system (e.g., system 100) for data preparation and personalization, while FIG. 3 illustrates use of the platform for data preparation alone.

In the example shown in FIG. 2, a product template 202 may be received at a product wizard 250. The product wizard 250 can provide a series of guided, selectable options, such as selectable template options, for purposes of creating a card product 114. The card product 114 may be provided to a particular production context 206 within a payment card data preparation environment 204. In example implementations, the product wizard 250 may be used manually to create and store a card product 114. The card product 114 may subsequently be used one or more times for data preparation, for example via a data preparation engine 220 as discussed below.

In examples, the product template 202 may be implemented as a structured set of information that is required for inclusion on a payment card according to a selected payment network provider (e.g., Visa, MasterCard, and the like). The product template 202 may be imported into the product wizard 250 as structured data, such as structured JSON files, which are read by the product wizard to determine data interdependencies among the fields used to configure a payment card in a manner compatible with the selected payment network provider. An example of operation of the product wizard 250 is illustrated in further detail below in conjunction with FIGS. 16-23. However, generally speaking, an output of the product wizard 250 is a card product 114 as described above.

In the example shown, the card product 114 is maintained within a particular production context 206, which in turn is maintained within a production environment 204. The production environment 204, production contexts, and the like, may be hosted at a card data preparation platform that is capable of generating one or more user interfaces displayable to a user, typically a user at a banking institution, card bureau, or the like. The production environment 204 represents a general workspace within which card data preparation and personalization may take place, and may be based, at least in part, on an identity of a payment network to be used. The production environment 204 specifies the mode of data preparation that is selected (e.g., a full personalization process, data preparation alone, or personalization alone). The production environment 204 may also provide a token, card management key, and an optional transport key for use by other components.

In the example shown, the production context 206 retains a card configuration 120. The card configuration 120, as described above, describes capabilities of a given card and how that card may be populated with chip, application, and data layout information during a personalization process. In this example, the card configuration 120 is a logical construct separate from the card product 114. That is, the card product 114 may be used for data preparation, while the card configuration 120 may be used as part of the personalization process. Additional details about this separation of logical elements of a payment card are provided below.

The production context 206 provides a link between the production environment 204 and the selected card product and card configurations to be used for data preparation and personalization. As noted above, a production context 206 may be used to associate the environmental information (cryptographic tokens, transport keys, modes of data preparation and personalization, and the like) from the environment with card product information (data in a data object table, DGI layouts, and the like) and card information (CPLC information, card key information, and subsidiary chip, application, and DGI layout information).

In the example shown, a data preparation engine 220 is maintained within the environment 204. The data preparation engine 220 receives the card product 114, as well as other data elements that may be defined within the environment 204 or received at the environment via an import file, for example an editable object file. The other data elements may include, for example, data 210, including a profile identifier, a series of tag, length, and value data elements (TLV's), and various configuration settings. The data preparation engine 220 may then be used to generate a prepared card product 225. In particular, the data preparation engine can iterate through a data object table included in the product definition 114, and uses the data 210 to resolve data object values in the table to create the prepared card product 225 following the rules specified by card product 114.

Upon completion of the data preparation process, the prepared card product 225 generally includes additional information relative to the product definition 114, in that it includes data object tables, terminal DGI layouts and the like. However, the prepared card product 225 has data object values resolved within that structure. Accordingly, the prepared card product 225 has all information, including individual cardholder data, other than information specific to the card configuration applicable to the personalization target (e.g. applet-specific internal DGIs, applet version).

The personalization engine 230 receives the prepared card product 225, and obtains a card configuration 120 (also referred to as a card definition) from the production context. The personalization engine uses the card configuration 120 (the card key, CPLC, plus chip information including authentication methods, APDU handling, applications, and the like) to resolve any remaining unresolved data objects in the prepared card product 225 and generate payment card(s) 240 in accordance with that information. In particular, the personalization engine 230 forms internal DGIs on the card, authenticates the physical chip on the card, selects the applications as defined in the card configuration 120, and performs personalization on the card based on the information included in the prepared card product 225.

It is noted that the overall process performed within the environment 204 the data preparation engine 220, and the personalization engine 230 may be performed in a single process, also referred to herein as a "one-step" method. In the alternative, a user of the platform may elect to perform only data preparation, or only personalization. This allows a user to perform data preparation steps at a first time (e.g., offline) to create the prepared card product 225, and to subsequently perform personalization to create payment cards at a time or location more convenient to that user. If a user elects to perform only the personalization process, that user may either begin with a previously-created card product 114 and card configuration 120, or may begin at the stage where a prepared card product 225 has already been created.

If the user elects to perform only the data preparation process, that user may perform processes within the environment 204 up to and including creation of the prepared card product 225. An example of this arrangement is seen in FIG. 3, in which a card product 114 is used at the data preparation engine 220 to create a prepared product. In this arrangement, no cards are configured, but instead, the card product 114 and the input data 210 are used by the environment 204 to create prepared product 225. Notably, the production context 206 may exist within more than one environment; in such cases, the specific production context may be specified in the input data 210. The prepared product 225 may be stored within the platform, or may be exported for view/testing, as illustrated in conjunction with FIG. 4.

Referring now specifically to FIG. 4 a further illustration of the payment card platform 200 is illustrated. In this example, the payment card platform 200 is configured to perform a data preparation process (e.g., without personalization) followed by export of the prepared card product 225. FIG. 4 generally illustrates components that correlate to those of FIG. 2; however, once the prepared card product 225 is created, the card configuration 120 is not required because no personalization process is performed.

Once the data preparation process is completed, the prepared card product 225 is created. Accordingly, a personalization process may be performed at some point later in time within the environment 204. In some instances where personalization, data validation, or other processes are desired to be performed on a different platform from the one shown, a translator 402 may be provided, which converts the prepared card product 225 to a desired output format, for delivery to a requester 404. The requester 404 may be a third party requester system that may perform its own personalization process, or may be used for testing or validation of the prepared card product. In situations where the requester is another personalization system, the manager/user of that system may provide the translator 302 to ensure compatibility of the output translated version of the prepared card product.

Figure 5:
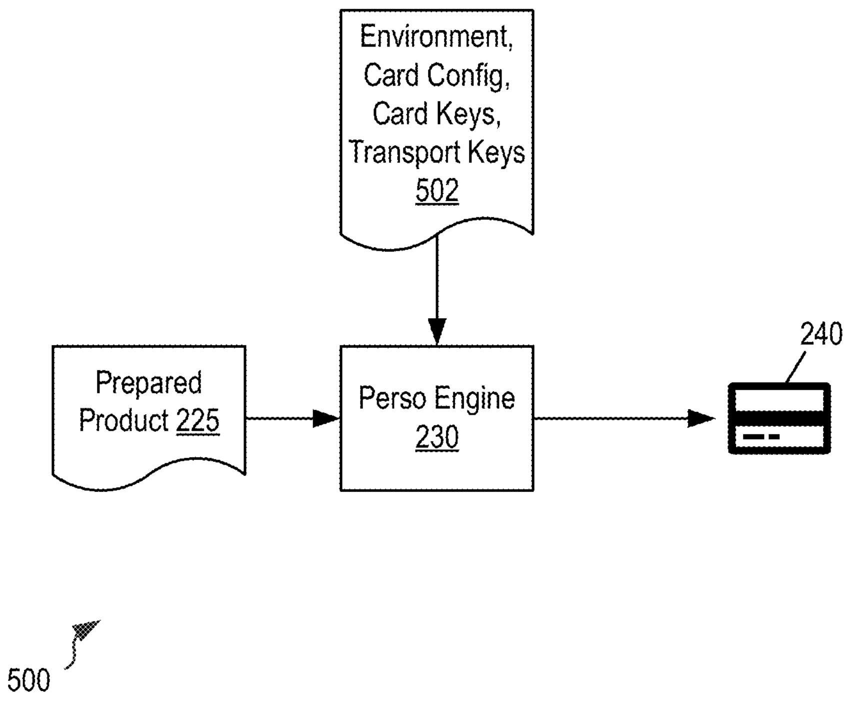
FIG. 5 illustrates a functional diagram of data inputs to a personalization engine usable within the payment card platforms described herein.

FIG. 5 illustrates a functional diagram 500 of data inputs to a personalization engine usable within the payment card platforms described herein. In this example, the prepared card product 225 is provided to the personalization engine 230. The personalization engine also receives data 502 including environment information, a card configuration, card keys, and transport keys. The data may be included, either in part or whole, as part of a card configuration 120. The personalization engine 230 may use this information to create payment cards 240 as part of the personalization process, as discussed previously.

Figure 6:
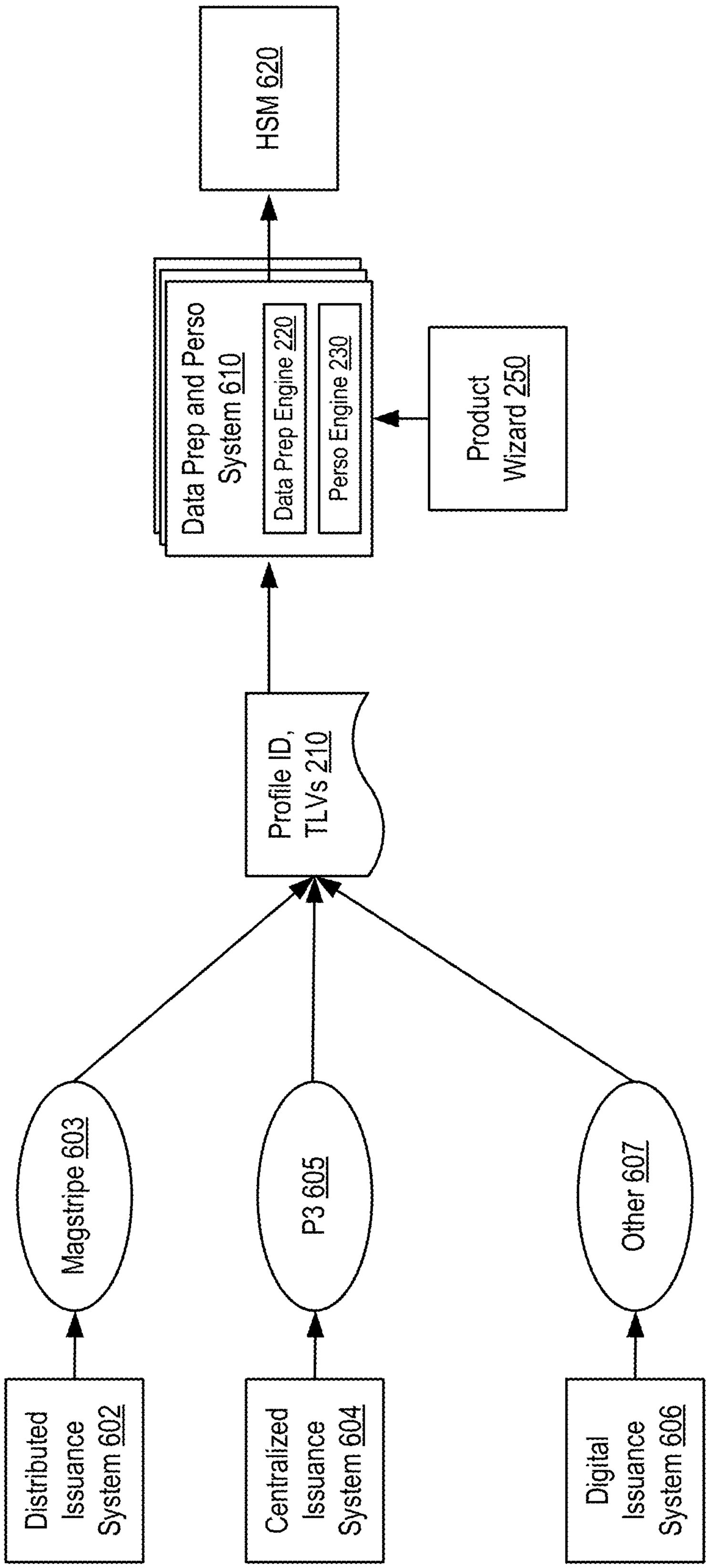
FIG. 6 illustrates an example computing infrastructure usable by international financial institutions and/or card bureaus to implement a payment card data preparation system as described herein.

FIG. 6 illustrates a computing infrastructure arrangement 600 in which data inputs useable to create data 210 for input to a data preparation and personalization system 610 may be provided. In the example shown, data may be received from a distributed issuance system 602, a centralized issuance system 604, or a digital issuance system 606. Each of the types or formats of data may output data of different formats. For example, the distributed issuance system 602 may provide magstripe data 603, the centralized issuance system 604 may provide P3 data 605, and the digital issuance system 606 may output other data 607, formatted according to a different output format, respectively, that is configured to receive this third party (e.g., card issuer) data in its original format and convert that data to a common format. In examples, the third party data may include a header or other identifier to indicate the type of data and/or type of translator that is to be used. Each type of data 603, 605, 607 may be selectively included within the data 210 to be provided to a data preparation and personalization system 610, which hosts, e.g., an environment 204 that includes the data preparation engine 220 and personalization engine 230.

The data 210 may include some baseline, or required, elements for use by the data preparation engine 220. For example, the data 210 may include a profile identifier and a baseline set of tag length value (TLV) entries, such as entry tags 5A, 5F20, 5F24, 5F30, 9F1F, 9F20, 57. Optionally, the data 210 may include an environment name, other TLV datasets, and configuration settings. In the various embodiments, the data 210 need not include a job identifier, as this may be handled elsewhere within the platform.

In the example shown, the data preparation and personalization system 610 may also receive a card product 114, for example from a product wizard 250, to create a card (e.g., card 240), or otherwise provide card data to a hardware security module (HSM) 420 as shown.

The example arrangement shown in FIG. 6 is usable by financial institutions and/or card bureaus to implement a payment card data preparation system as described herein. In this example, the computing infrastructure arrangement 600 can include one or more card bureaus and/or financial institutions that also act as card issuers, practicing various issuance models including centralized issuance system 604, distributed issuance system 602, and digital issuance system 606 as mentioned previously. In each case, that entity may use the wizard 250 to generate a card product 114, which is passed to the data preparation and personalization system 610, which may be implemented on a card management platform. Accordingly, the card management platform may implement aspects of the payment card data preparation system 100 described above including at least an environment 204, including the data preparation engine 220 and personalization engine 230. In each issuance case, the issuance system 602, 604, 606 may provide card data through a translator such as 603, 605, 607, to create the data 210 that is passed to a card management platform.

In this example, the card management platform, in particular the data preparation and personalization system 610, is communicatively connected to a hardware security module (HSM) 620. The HSM 620 may store and manage keys on behalf of the card issuer. In some embodiments, the issuer may implement more than one card management platform, and depending on service needs and overall volume, load balancing and failover across the various card management platforms may be provided.

FIG. 7 is a schematic illustration of a Data Generation and Initialization (DGI) layout 700, according to an example embodiment. The DGI layout 700 includes a plurality of tag, length, and value (TLV) entries in a structured arrangement. The DGI layout 700 includes data structured as a series of tags, each of which consists of a numeric code, a length indicator, and the actual value of the data. The payment card data uses TLV format to represent information such as the card number, expiration date, cardholder name, and other details associated with the transaction. For example, a TLV-encoded payment card might include a tag with the code "5A" to represent the cardholder name, followed by a length indicator specifying the number of characters in the name, and the actual name value itself. Other values and tags may be used as well, as illustrated in the below described user interfaces and systems.

Figure 8:
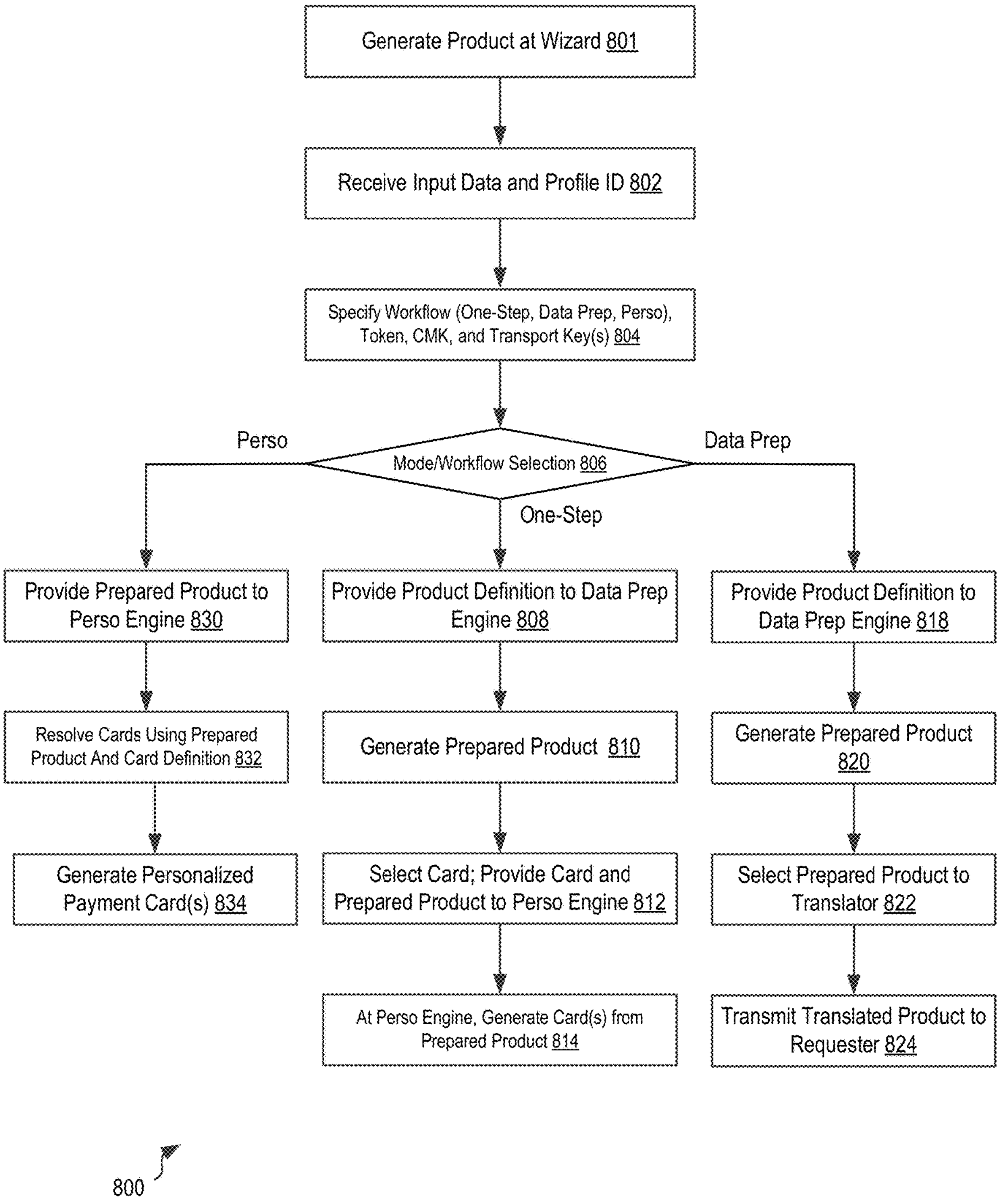
FIG. 8 illustrates a flowchart of a method of performing one or more of data preparation or personalization within a payment card data preparation system, according to an example embodiment.

FIG. 8 illustrates a flowchart of a method 800 of performing one or more of data preparation or personalization, according to an example embodiment. The method 800 may be performed, for example using the payment card data preparation system 100 described herein.

In the example shown, the method 800 includes generating a card product at a wizard (step 801). The wizard may be, for example, a card wizard presenting a user interface having a set of sequentially displayed template options. An example implementation of such a wizard is described further below in conjunction with FIGS. 16-23.

In the example shown, the method 800 includes receiving input data and a profile identifier (step 802). The input data may include, for example, the input data 210 described above, and the profile identifier may be input to a payment card platform 200, for example by selecting an environment 204 and/or production context 206 to be used as part of a data preparation process.

In the example shown, the method 800 further includes a workflow within a card data preparation system, and in particular within a card data preparation system 100 (step 804). The workflow may represent particular selectable options within an environments, for example defining a one-step workflow, a data preparation only workflow, or a personalization only workflow. At operation 806, it is determined which workflow is selected, thereby enabling one or more a data preparation process or a personalization process. For example, a one-step mode, a data preparation only mode, or a personalization only mode may be selected, thereby identifying one or both of the data preparation and personalization processes to be performed.

If the one step mode is selected, operation proceeds with providing a card product to a data preparation engine (step 808) and input data 210. Providing the card product information may include, for example, providing a card product 114 to data preparation engine 220. Examples of card product information are illustrated below in conjunction with the user interfaces, or user screens, of FIGS. 9-15.

Continuing from step 808, the method 800 can include generating a prepared product (step 810) such as prepared card product 225 described previously. The method may further include selection (either explicitly or implicitly) of a card configuration, in providing the card configuration and prepared card product to the personalization engine (step 812). At the personalization engine, one or more payment cards may be generated, for example by resolving remaining data objects in the prepared card product using information in the card configuration, as well as combining the prepared card product with any card-specific information (e.g., keys and the like) maintained within the card configuration or encrypting data using the negotiated card session key (step 814).

If a data preparation only mode is selected, operation proceeds with providing a card product to a data preparation engine (step 808) and input data 210 to the data preparation engine, and generating a prepared card product (steps 818, 820), as previously described in conjunction with steps 808, 810. However, rather than providing the prepared card product to a personalization engine, prepared card product is instead sent to a translator, such as translator 302 depicted in FIG. 3 (step 822). The translator may, once prepared card product is translated in accordance with a desired performance, transmit the translated products to a requester, such as requester 304 of FIG. 3 (step 824).

If a personalization only mode is selected, the operation proceeds with selection (either explicitly or implicitly) of a card configuration, in providing the card configuration and prepared card product to the personalization engine (step 832). The personalization engine will then generate one or more personalized cards, such as cards 240 of FIG. 2 (step 834).

Referring to FIG. 8 generally, it is noted that aspects of creating a card issuance environment, production context, product definition, and card configuration, as well as facilitation of the data preparation process and personalization process may be enabled at the payment card platform 200 using a guided process by which various users (including those lacking detailed programming experience) may implement card issuance processes. FIGS. 9-15 illustrate selected user screens displayable by such a platform to assist with such a process.

Figure 9:
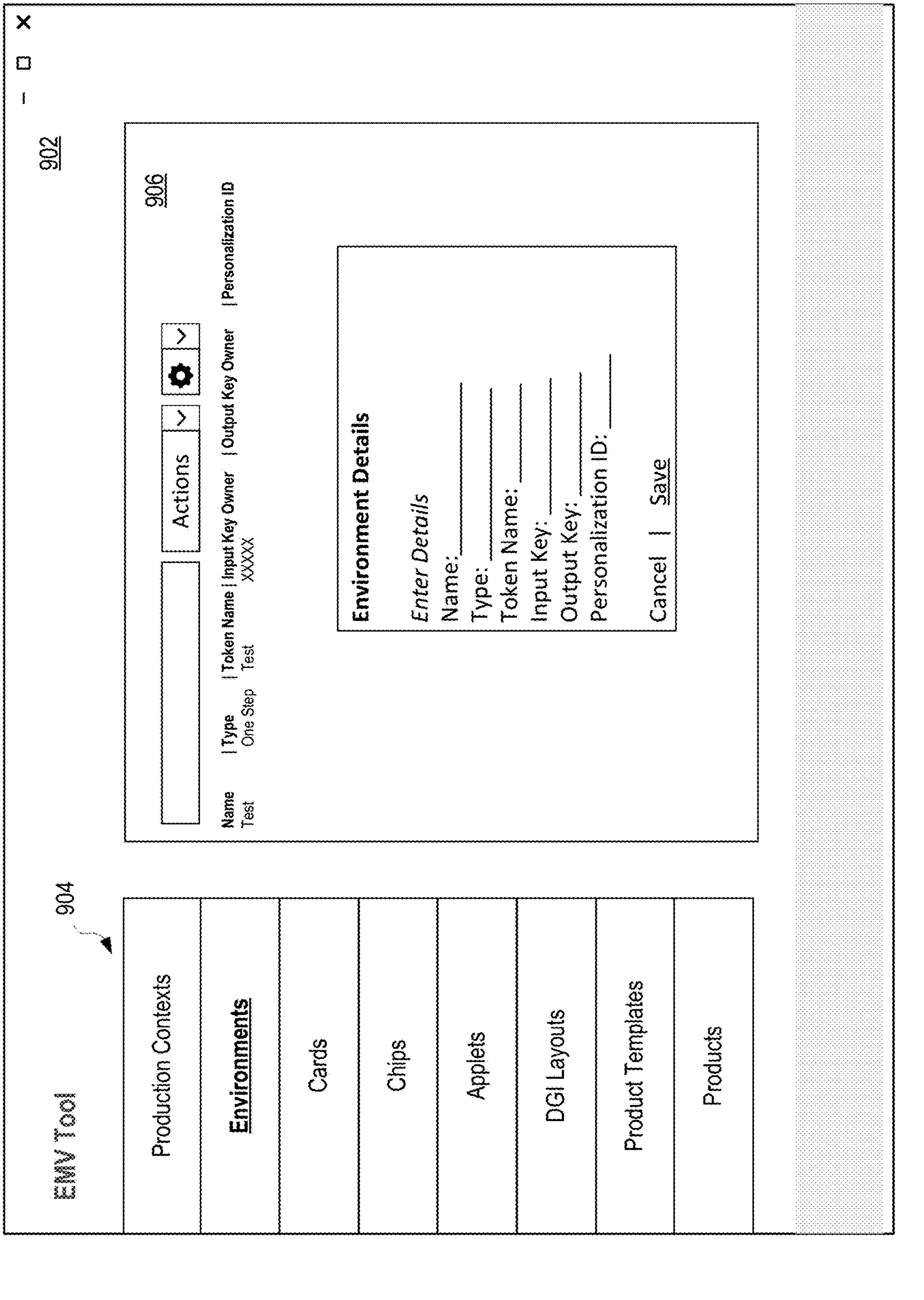
FIG. 9 illustrates an example user interface useable to define the one or more payment card profiles and the one or more card products, according to an example embodiment.

Referring specifically to FIGS. 9-15, an example user interface 900 is depicted which may present a plurality of screens and/or options useable to assist a user with a process of card data preparation and personalization, as described above. FIG. 9 illustrates the user interface 900, including a display region 902 and a menu region 904. In this example, the display region presents details regarding the relevant menu option selected. The menu options in the menu region include production contexts, environments, cards, chips, applets, DGI layouts, product templates, and products. Other menu options may be presented as well.

In the example shown, the Environments tab is selected, and a user may define a particular environment to be displayed in a listing of environments in listing region 906. In the example shown, a sub-window receives environment details regarding a new environment, including a name, type, token name, input key, output key, and personalization identifier. Previously created environments will be listed within the region 906. Each environment listed in the region 906 may correspond to an operational environment, such as environment 204 of FIGS. 2-3.

Figure 10:
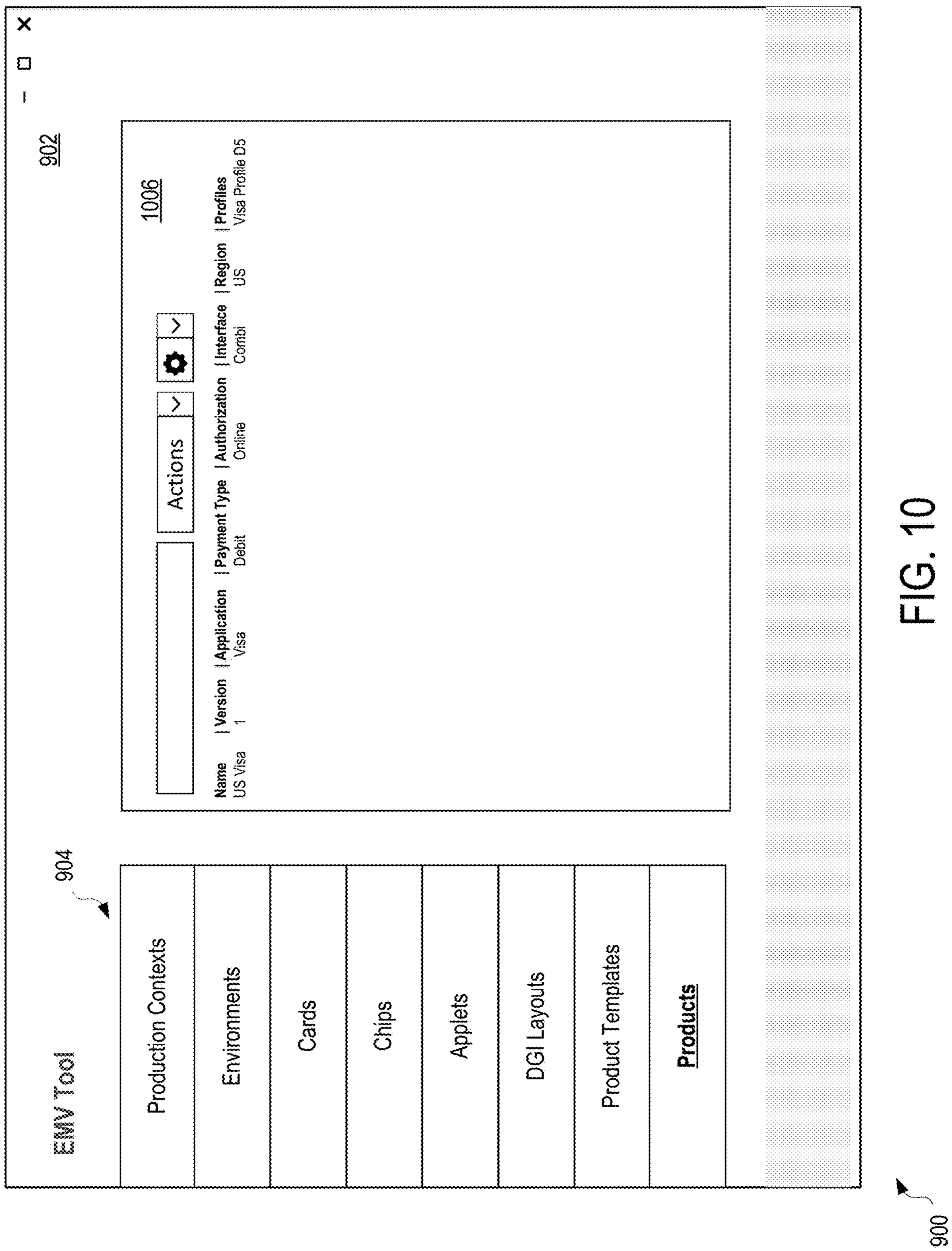
FIG. 10 illustrates a further example of the user interface of FIG. 9 in which product definitions are displayed.

FIG. 10 illustrates the user interface 900, but presents a display region 1006 in response to selection of a Products option within the menu region 904. In this example, a particular card product may be listed, with each card product corresponding to a card product 114 of FIGS. 2-3. In this example, the card product may include a name, a version, and application, a payment type, an authorization, an interface, a region, and a related profile. This set of selected options provide the card product with which values may later be associated during the data preparation process.

Figure 11:
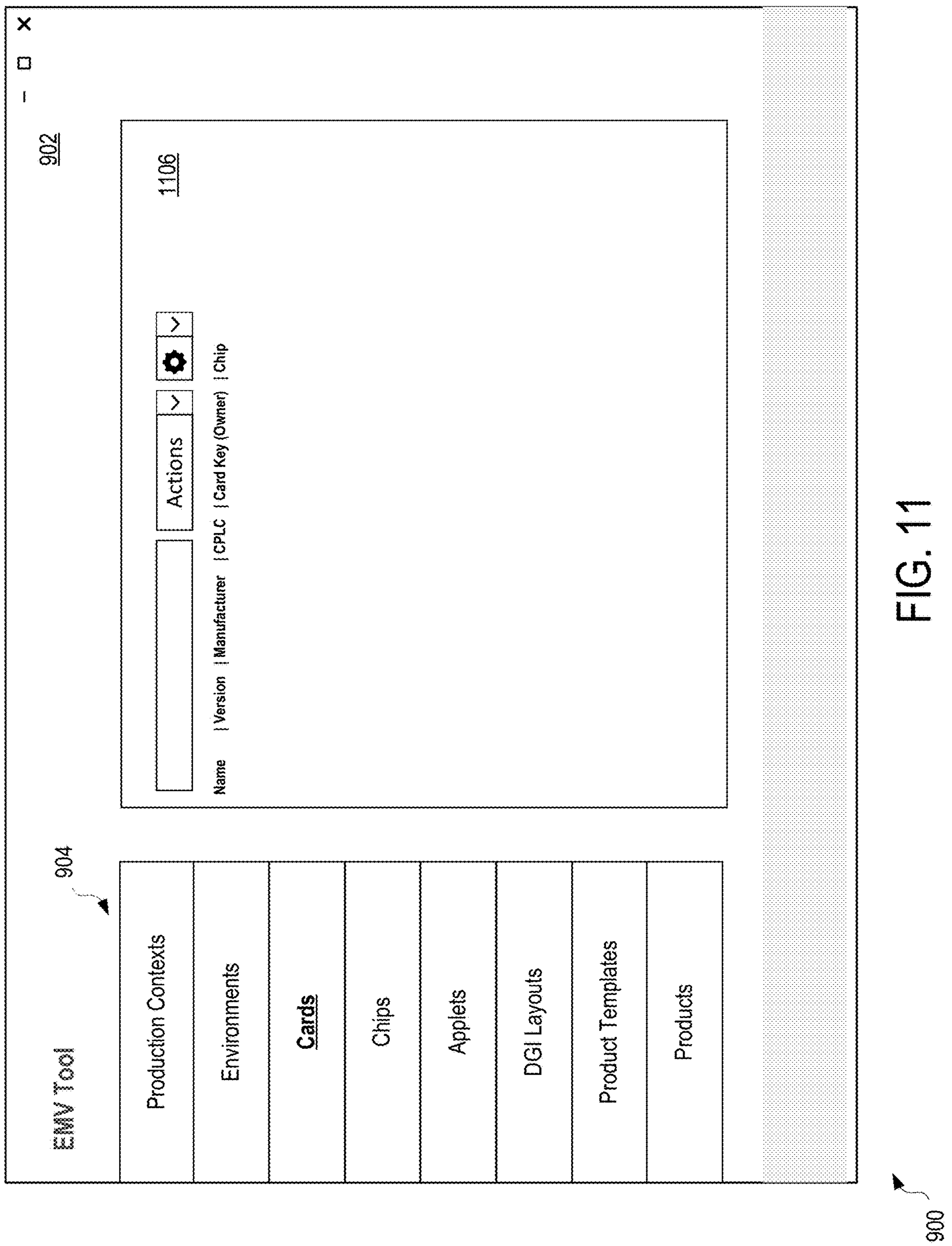
FIG. 11 illustrates a further example of the user interface of FIG. 9 in which card definitions are displayed.

FIG. 11 illustrates the user interface 900, but presents a display region 1106 in response to selection of a Cards option within the menu region 904. In this example, the display region 1106 illustrates a card configuration, which may correspond to the card configuration 120 of FIG. 2. The card configuration may include a name, a version, a manufacturer, a CPLC value, a card ley, and a chip identifier. Other information may be included as well.

Figure 12:
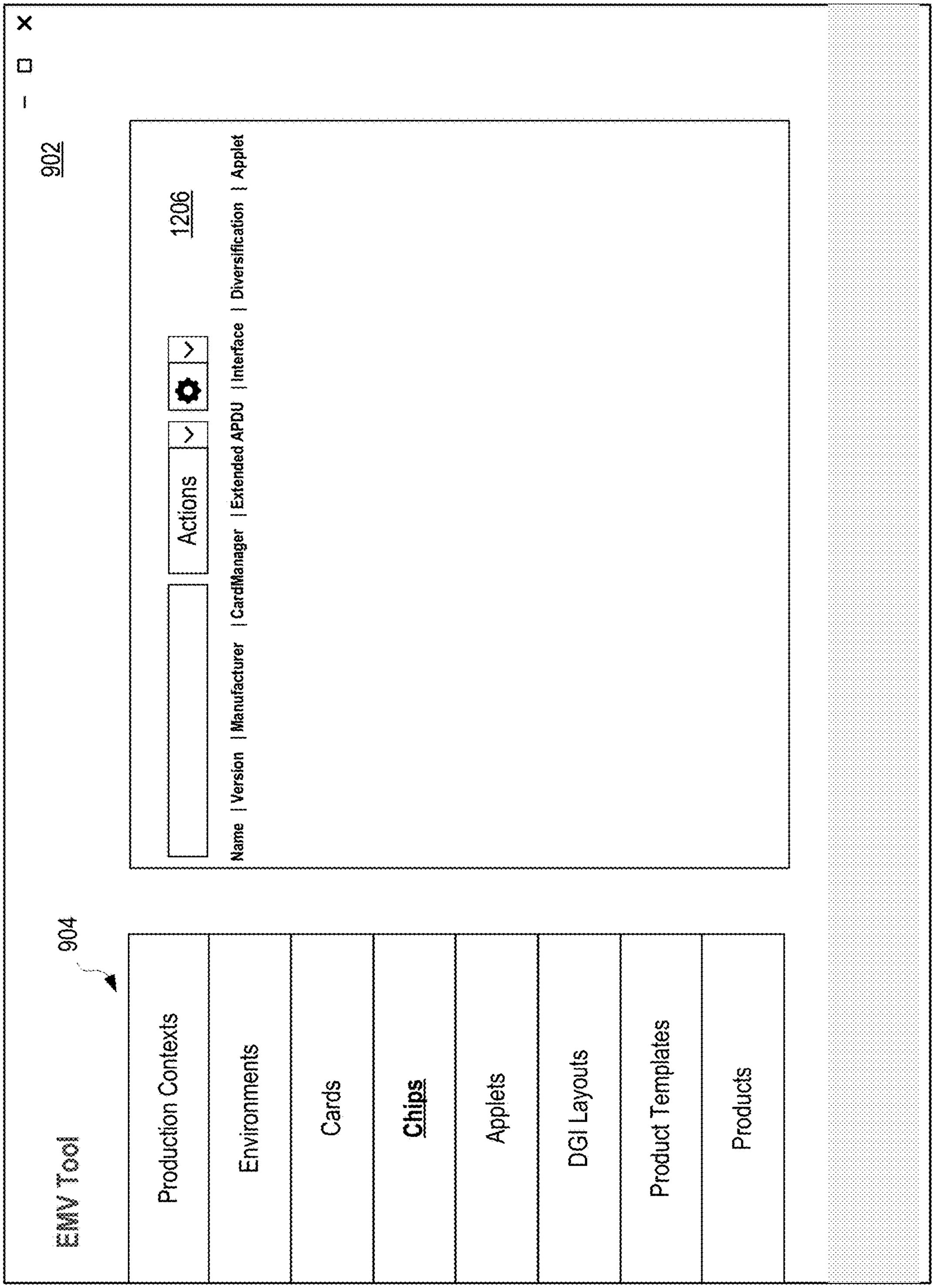
FIG. 12 illustrates a further example of the user interface of FIG. 9 in which chip definitions are displayed.

FIG. 12 illustrates the user interface 900, but presents a display region 1206 in response to selection of a Chips option within the menu region 904. In this example, the display region 1206 illustrates a chip definition, which may be incorporated into the card configuration and may include a chip name, version, manufacturer, card manager, APDUs, interface, diversification settings, and one or more applet identifiers for applets to be installed on the chip that is associated with a particular card.

Figure 13:
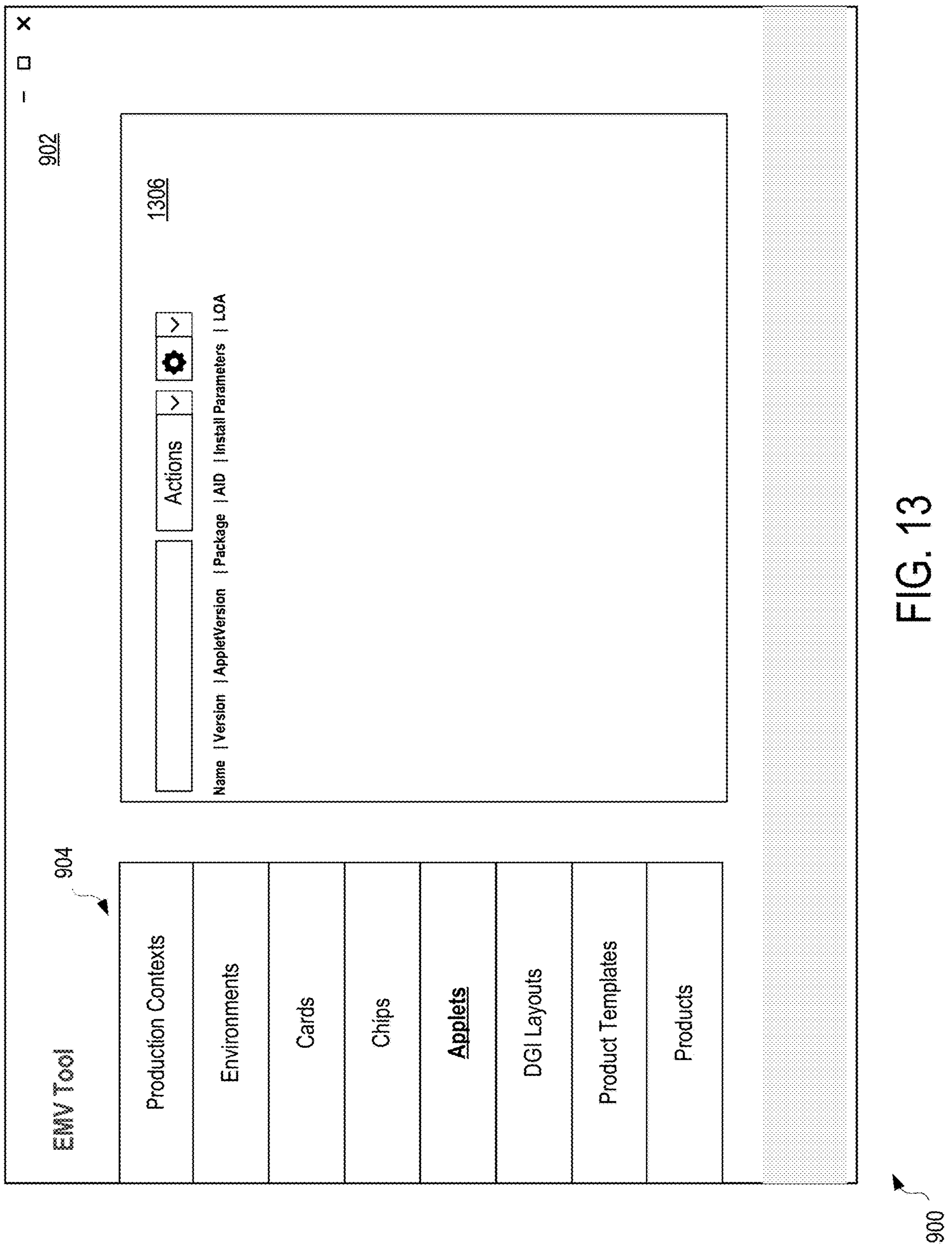
FIG. 13 illustrates a further example of the user interface of FIG. 9 in which applet definitions are displayed.

FIG. 13 illustrates the user interface 900, but presents a display region 1306 in response to selection of an Applets option within the menu region 904. In this example, the display region 1306 illustrates a definition of one or more applets that may be included in programming on a chip, and includes a name, version, applet version, package information, applet identifier, installation parameters, and other descriptive information regarding the applet. As with other views generated by the user interface, one or more applets may be defined and maintained in the listing within the display region 1306.

Figure 14:
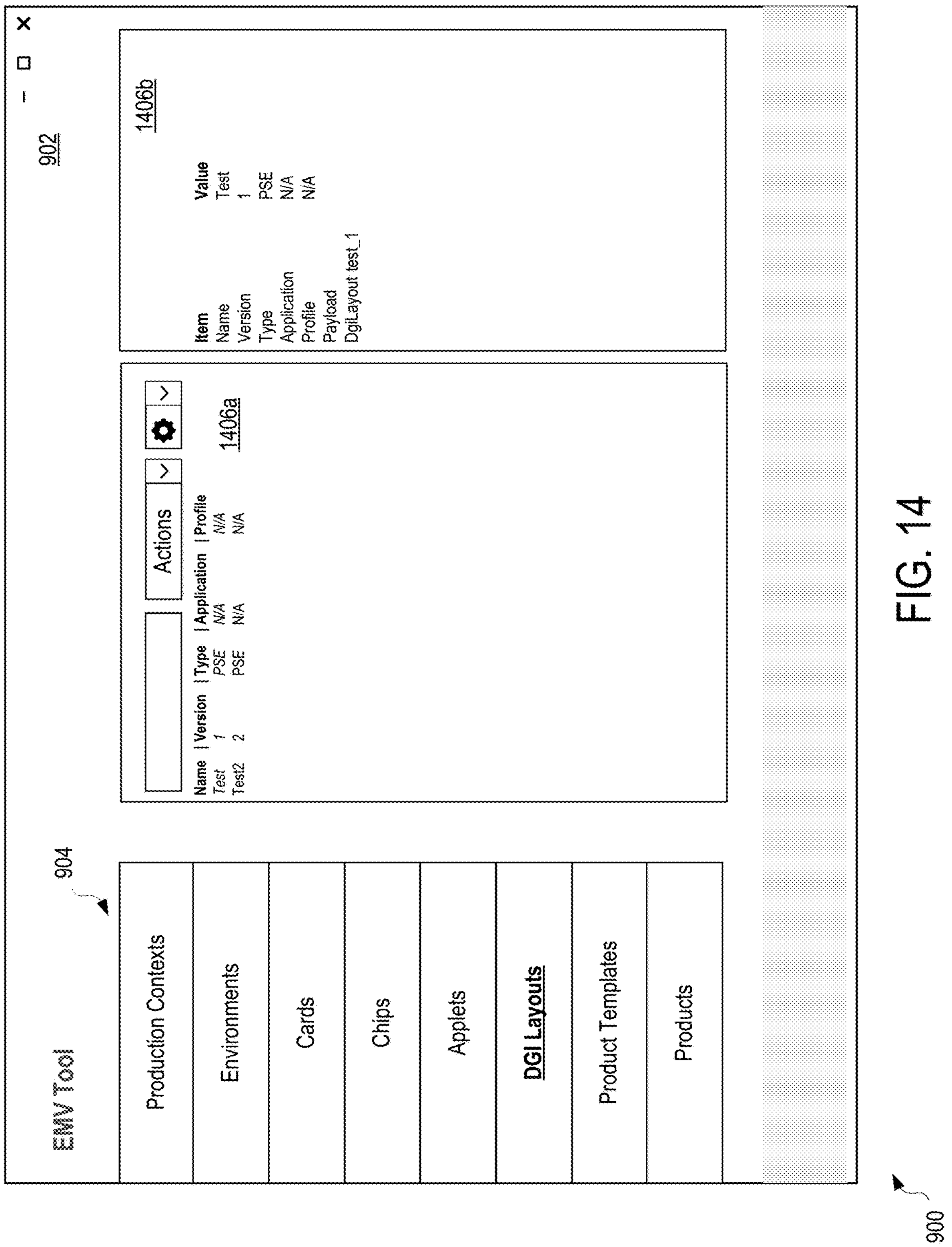
FIG. 14 illustrates a further example of the user interface of FIG. 9 in which DGI layout definitions are displayed.

FIG. 14 illustrates the user interface 900, and presents a pair of display regions 1406*a-b* in response to selection of a DGI layouts option within the menu region 904. In this example, a plurality of DGI layouts are illustrated in the region 1406*a*, and selection of one of those DGI layouts (in this case the "Test" layout), results in display of detailed settings for the DGI layout in region 1406*b*.

Figure 15:
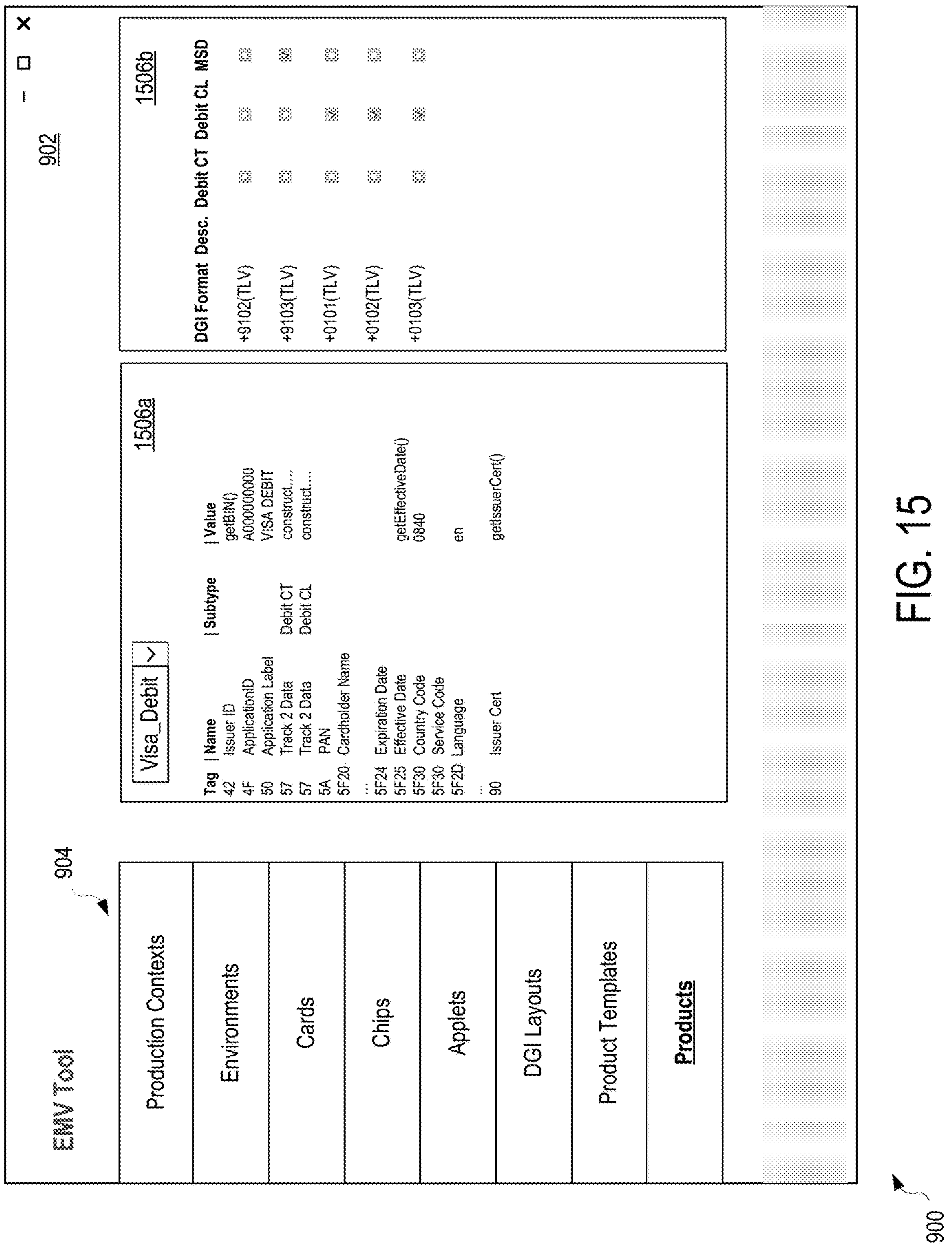
FIG. 15 illustrates a further example of the user interface of FIG. 9 in which details regarding a selected product definition are displayed.

FIG. 15 illustrates the user interface 900, and presents display regions 1506*a-b* in response to selection of the Products option within the menu region 904. In this example, display region 1506*a* displays a drop-down window in which a user may select a particular application instance of a card product. Upon selection of the application instance, product data may be displayed, including tag, tag name, subtype, and value information may be presented (e.g., corresponding to TLV values that may be stored on the tag). Display region 1506*b* may present specific selectable values for individual DGI formats.

Referring to FIGS. 9-15 generally, it is noted that the user interface 900 and its associated screens and display regions, and the platform overall, allow for definition of various components of a card or environment in which a card is to be defined, but does not generally allow for deletion or later modification of such settings. Rather, adjustments of settings associated with a given environment, card, chip, or other component causes creation of a new listing of a new component that may be selected for use within the platform. That is, each of the created definitions is considered immutable, e.g., to prevent inadvertent or improper modifications to card and product definition information.

Still further, the user interface 900, and method 800 that may be implemented there with, provides flexibility to users by separating rules and logical structures for data preparation and personalization, such that either process may be performed or configured independently. Additionally, by placing selectable settings within definable environments, users may readily migrate between environments, such as a test for validation environment and a production environment, reusing card or product definitions in a straightforward manner.

Figure 16:
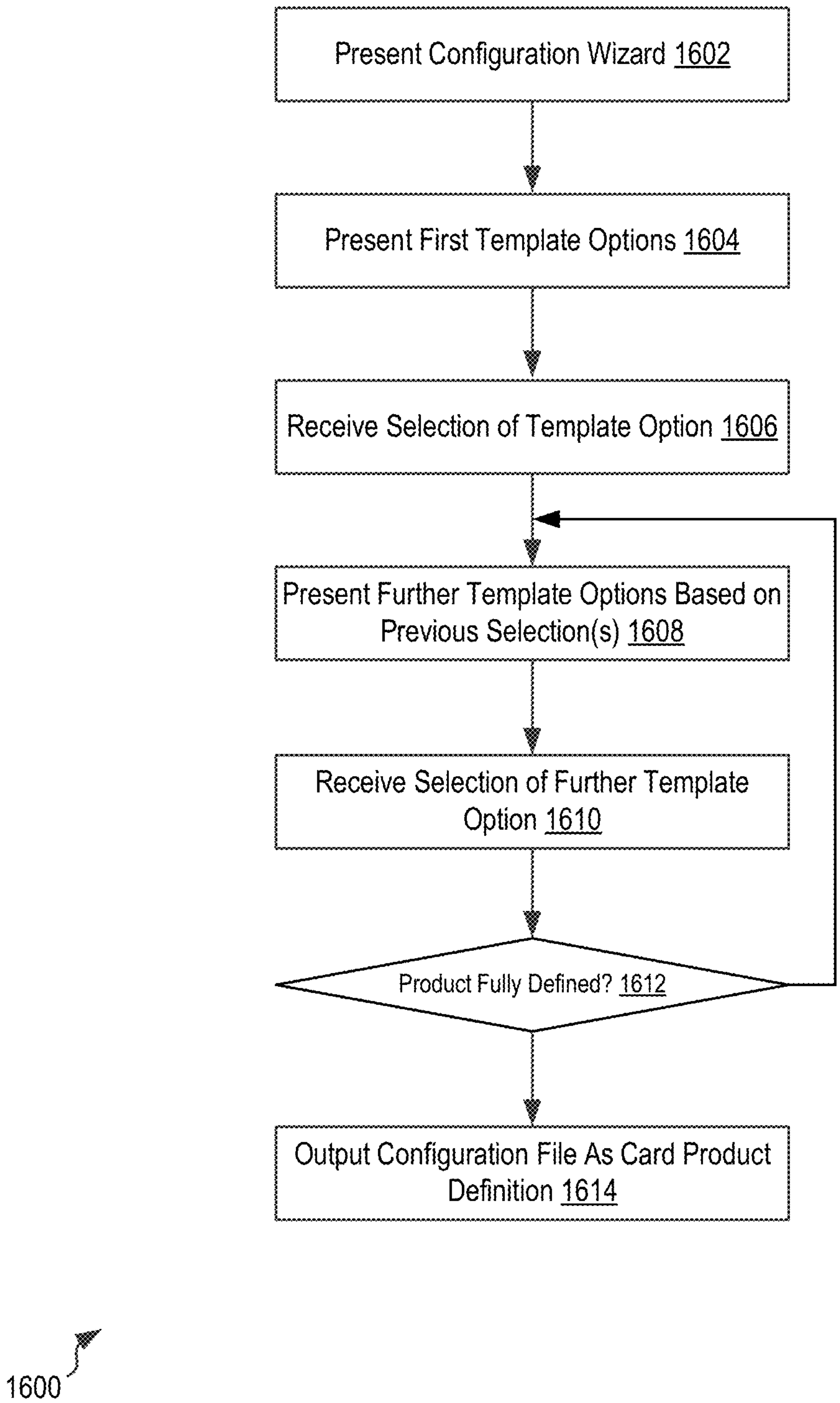
FIG. 16 illustrates a flowchart of a method of operation of a product wizard, such as a card wizard, useable to create a card product definition, according to an example embodiment.

Now referring to FIG. 16 a flowchart of a method 1600 of operation of a product wizard, such as a product wizard 250, is provided, according to an example embodiment. The method 1600 may assist a user in creating a card product, such as card product 114 of FIGS. 1-2. The method 1600 may be implemented on the same computing systems as the payment card data preparation system 100, or may be hosted on another system within a card data preparation environment, or may be provided through software as a service. In some examples, the method 1600 may be implemented in part via generation of a user interface having sequentially-displayed selectable template options in the manner illustrated below in conjunction with FIGS. 17-23.

In the example shown, the method 1600 includes presenting an initial wizard user interface (step 1602). The wizard user interface may be analogous to that shown, for example, in FIGS. 17-23. The method 1600 includes presenting, within the user interface, a first set of template options (step 1604). The set of template options may include options associated with an environment, such as a specific personalization templates or style, an application template, a payment templates, and the like. The method includes receiving a selection of a template option from among the presented options (step 1606).

In the example shown, the method 1600 includes presenting a further set of template options based on previous selections (step 1608). The further set of template options may vary, it may be a different type of template to be first set of template options. For example, if a first set of template options correspond to application templates or payment templates, the second, or dependent, set of options may be options that are available based upon the type of application or payment network to be used. For example, a Visa application templates may enable selection of one of a credit or debit payment template option, or selection of a credit payment template option may enable subsequence selection of online or off-line payment authorization options. Other examples and interdependencies all possible.

In the example shown, the method 1600 includes receipt of selection of a further template option from among the further template options presented (step 1610). If it is determined that all options are selected for a given product definition, at operation 612, method 1600 may proceed to allow output of a configuration file as a card product definition (step 1614). The output of such a configuration file may be enabled via the user interface, for example only once all template options are selected to enable completion of the product definition.

If, on the other hand, it is determined that additional options are required for selection to complete a product definition, at operation 612, method 1600 will return to presents further template options based on the updated selections received (returning to step 1608).

In conjunction with the method 1600 of FIG. 16, it is noted that a plurality of sequential screens presented within a wizard user interface may have a variety of appearance options, and a variety of types of templated information. One specific appearance of a user interface is provided in FIGS. 17-23, and the set of template options may be defined in underlying data maintained by a computing system generating the user interface for display. For example, the underlying data and template option interdependencies may be defined using structured metadata files, such as files in a Javascript Object Notation (JSON) format. Other implementation mechanisms are possible as well. One advantage of use of such an underlying structured metadata file arrangement for defining template option interdependencies is that this allows for simple rearrangement or revision of templates, and programmatic adjustment of such templates and options.

Figure 17:
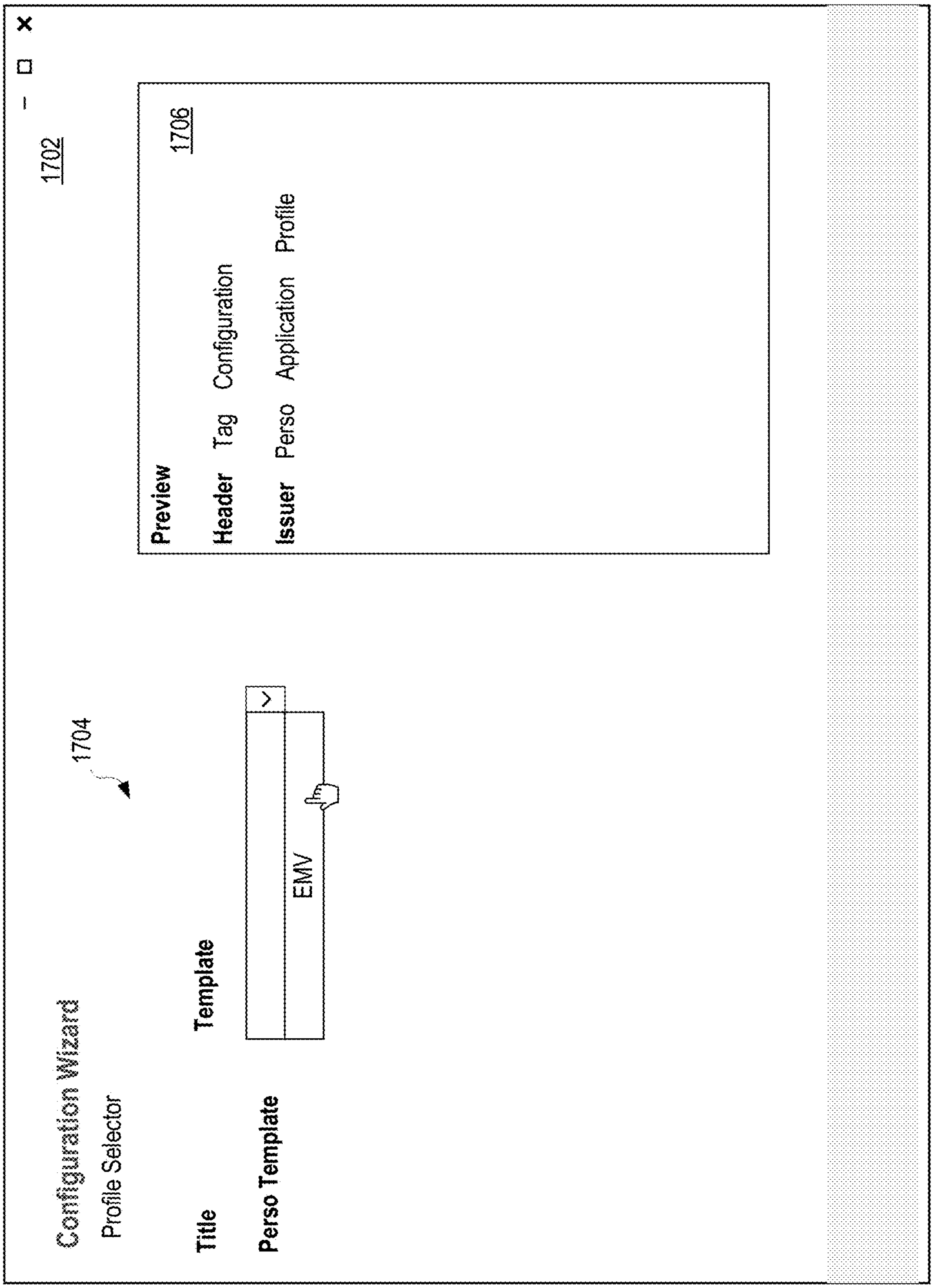
FIG. 17 illustrates an example user interface of a product wizard useable to create a card product definition, in an example embodiment.

FIG. 17 illustrates an example user interface 1700 of a product wizard useable to create a card product definition, in an example embodiment. The user interface 1700 may be displayed on one or more computing systems integrated with a payment card data preparation system 100, or communicatively connected thereto within an overall system.

In the example shown, the user interface 1700 includes a display region 1702 that includes a selectable option region 1704 and a preview region 1706. The selectable option region sequentially displays selectable template options for user selection, with the preview region displaying previewed details regarding an underlying product definition in response to such selections. In the example shown, a personalization template is selected ("EMV"), and no specific configuration settings are displayed, due to the lack of completeness of defining such a configuration.

Figure 18:
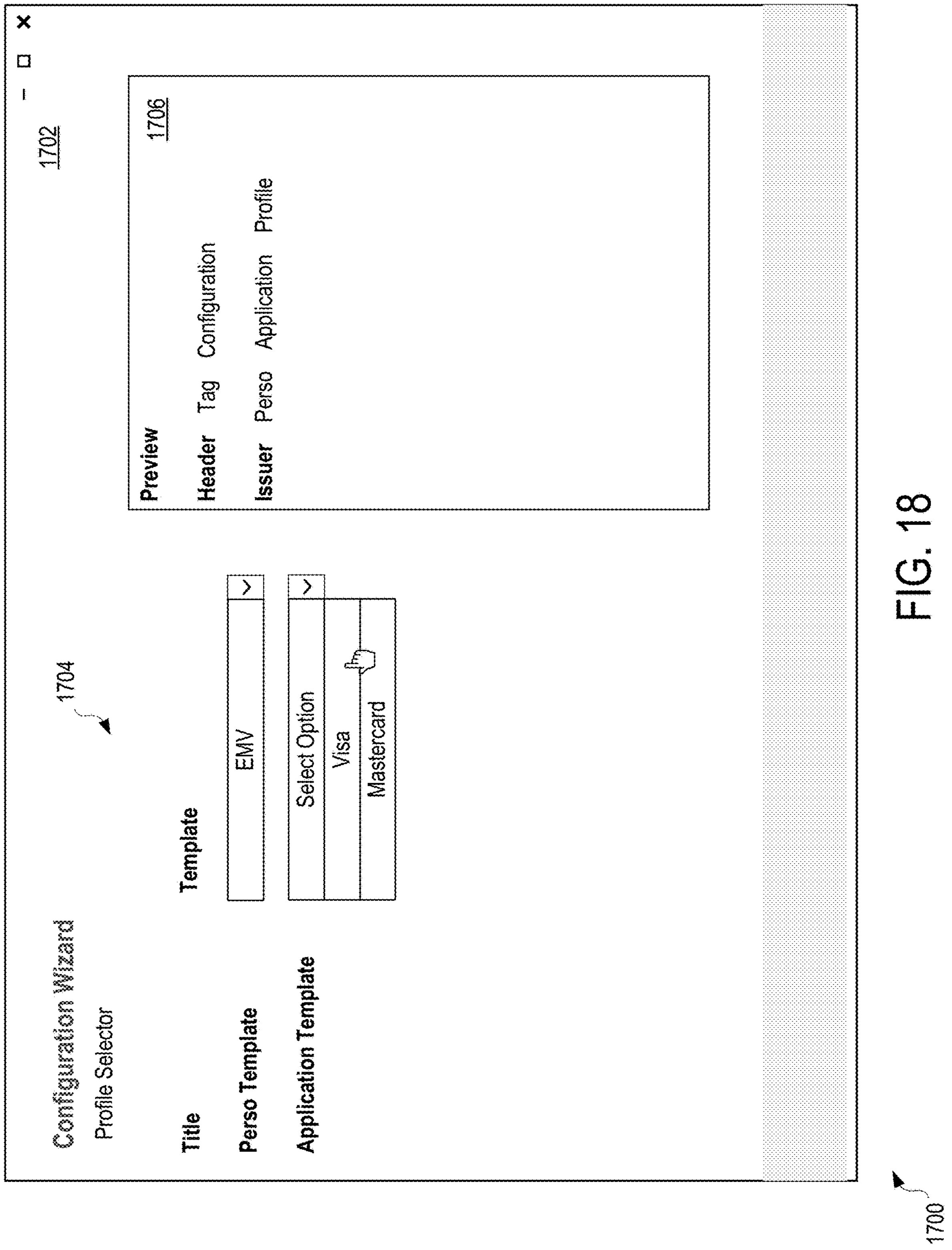
FIG. 18 illustrates an example user interface of a product wizard useable to create a card product definition, in an example embodiment.

FIG. 18 illustrates a further version of the user interface 1700, depicting subsequent selection of an application template in response to previous selection of a personalization template. In this example, the options of "Visa" and "Mastercard" are presented in response to selection of the EMV personalization template.

Figure 19:
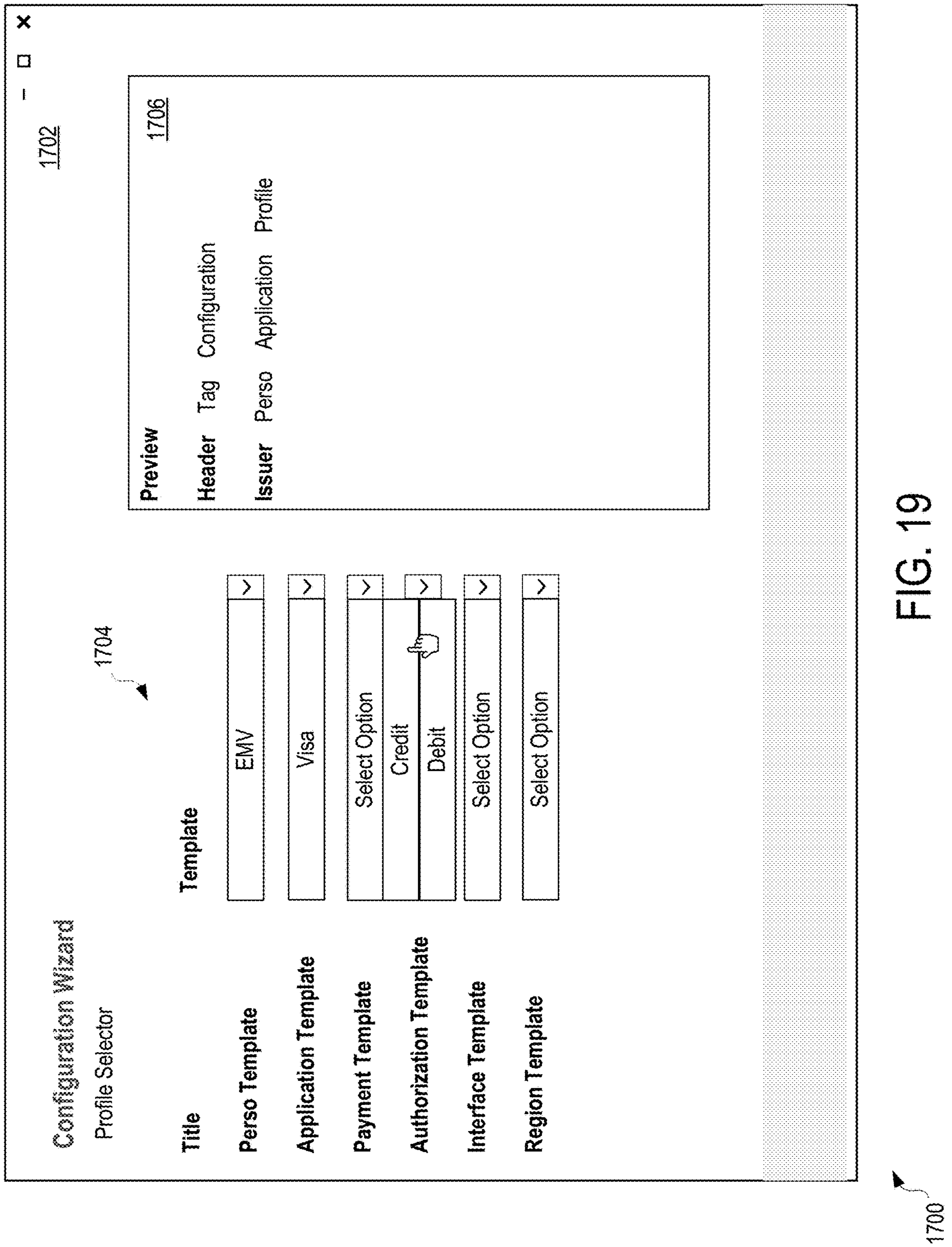
FIG. 19 illustrates an example user interface of a product wizard useable to create a card product definition after a template has been selected, in an example embodiment.
Figure 20:
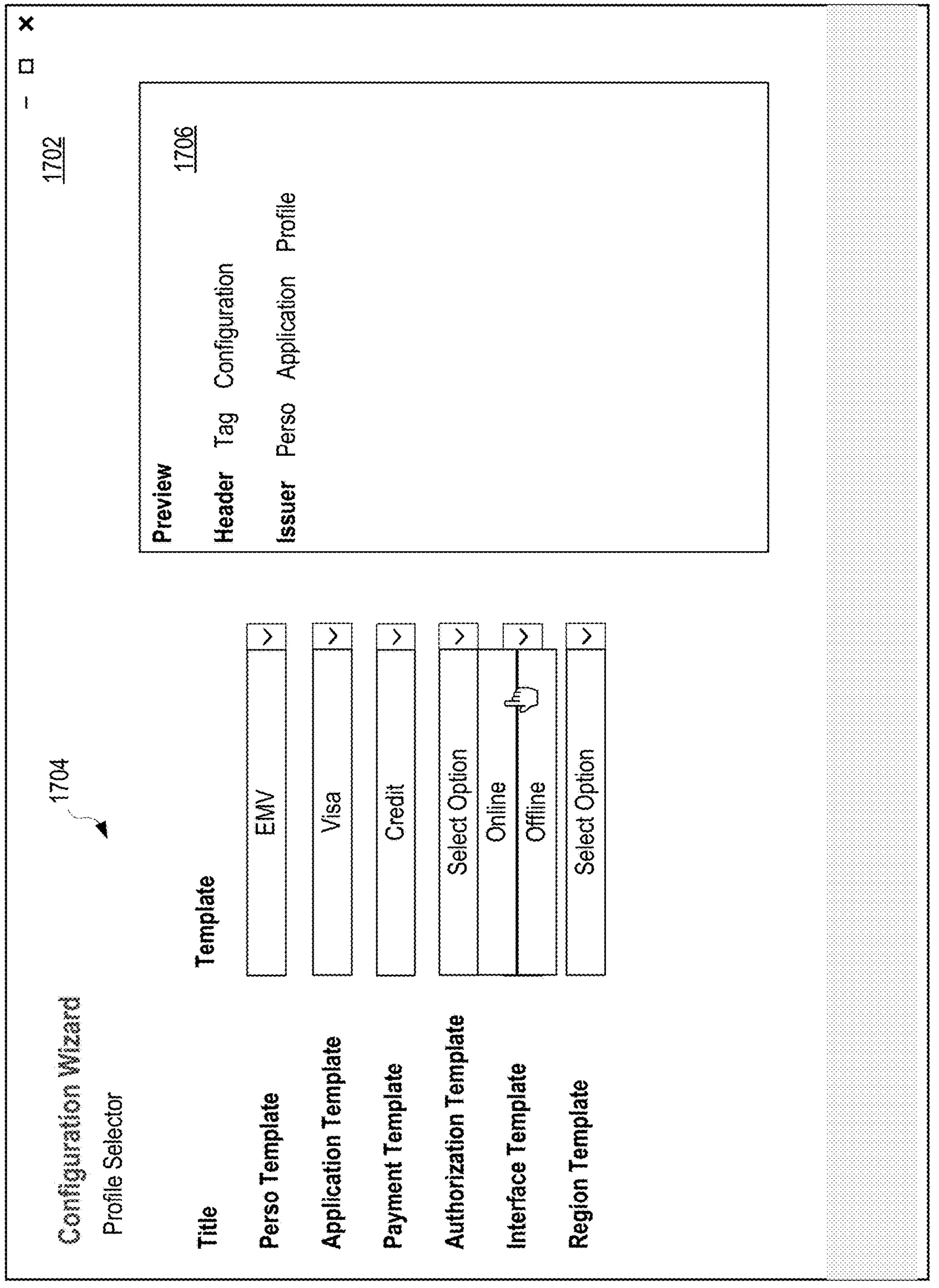
FIG. 20 illustrates an example user interface of a product wizard useable to create a card product definition after a further template has been selected, in an example embodiment.

FIG. 19 illustrates a further set of template options in response to selection of a particular application template in the version of the user interface 1700 depicted in FIG. 18. In this example, in response to selection of the "Visa" application template, a payment template having "Credit" and "Debit" options is displayed, as well as an authorization template selector, an interface template selector, and a region template selector are also shown. Each of these selectors may allow display of one or more template options for user selection. FIG. 20 illustrates a further selection of an "Online" option within the authorization template selector.

Figure 21:
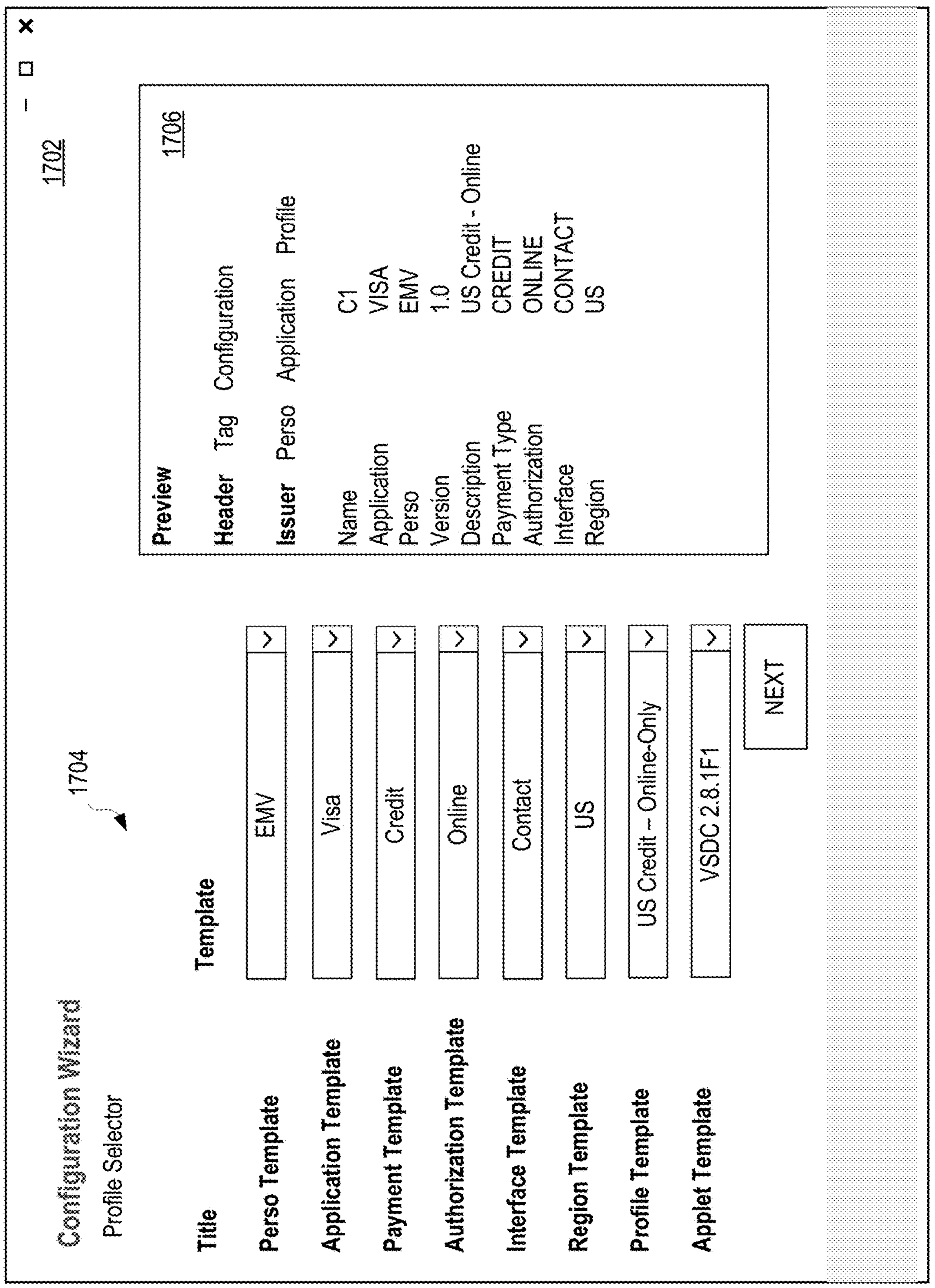
FIG. 21 illustrates an example user interface of a product wizard useable to create a card product definition after a further template has been selected, in an example embodiment.

FIG. 21 illustrates a further set of template options within the selectable option region 1704, in response to selection of the template options presented in FIGS. 17-19. In this example, a region template, a profile template, and an applet template are also selected. At this point, the preview region 1706 is able to display specific information associated with a card product definition, including information associated with headers, tags, and configuration data that may be programmed onto a payment card. In the example shown, header information is depicted, including name, application, personalization, version and description information, payment and authorization types, region and other information selected as part of the template selection process. Upon completion of the template selections, a user may be enabled to select a button to proceed with the process (e.g., the "next" button as depicted within the selectable option region 1704).

Figure 22:
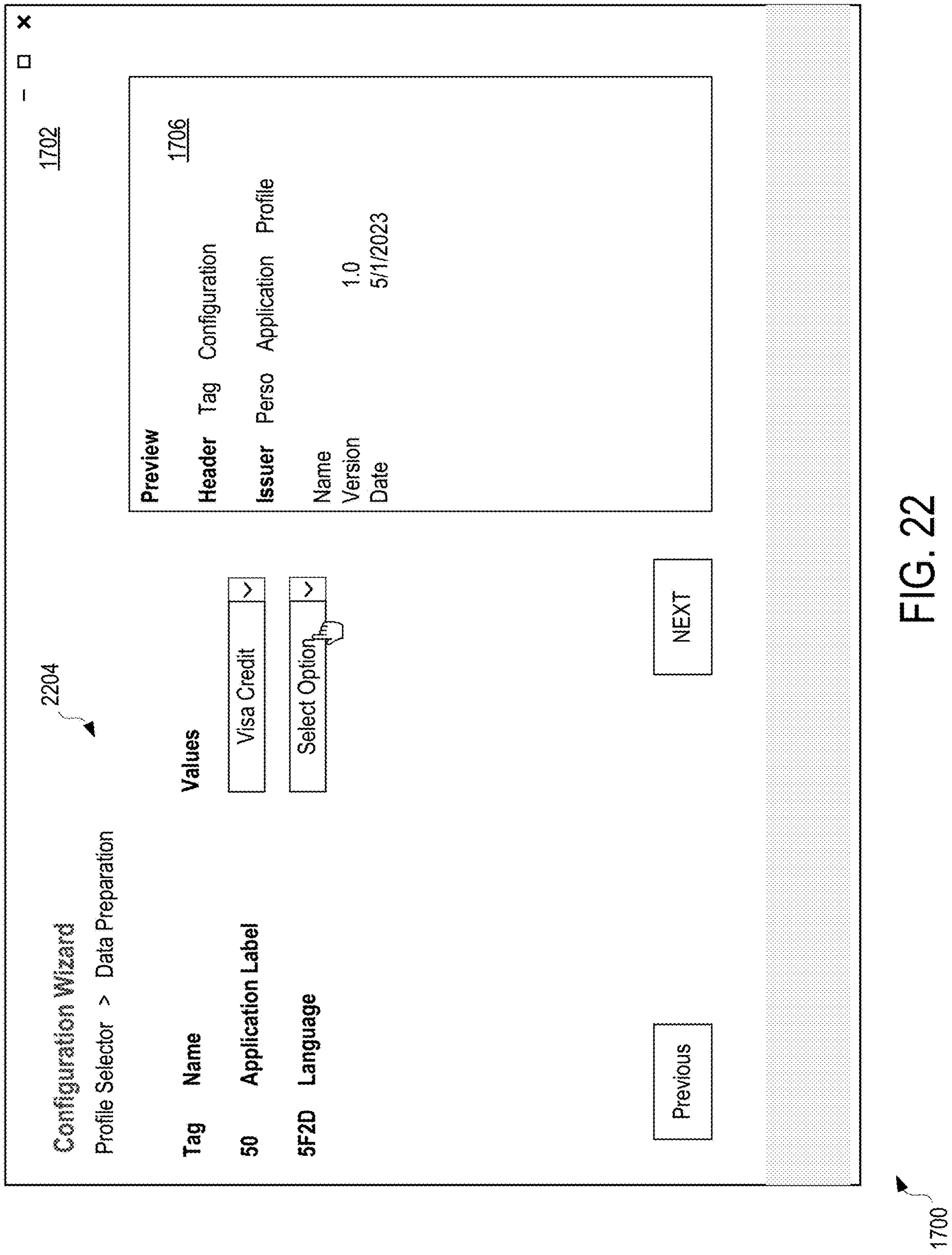
FIG. 22 illustrates an example user interface of a product wizard useable to create a card product definition after templates are selected and labels are to be applied to the card product definition, in an example embodiment.
Figure 23:
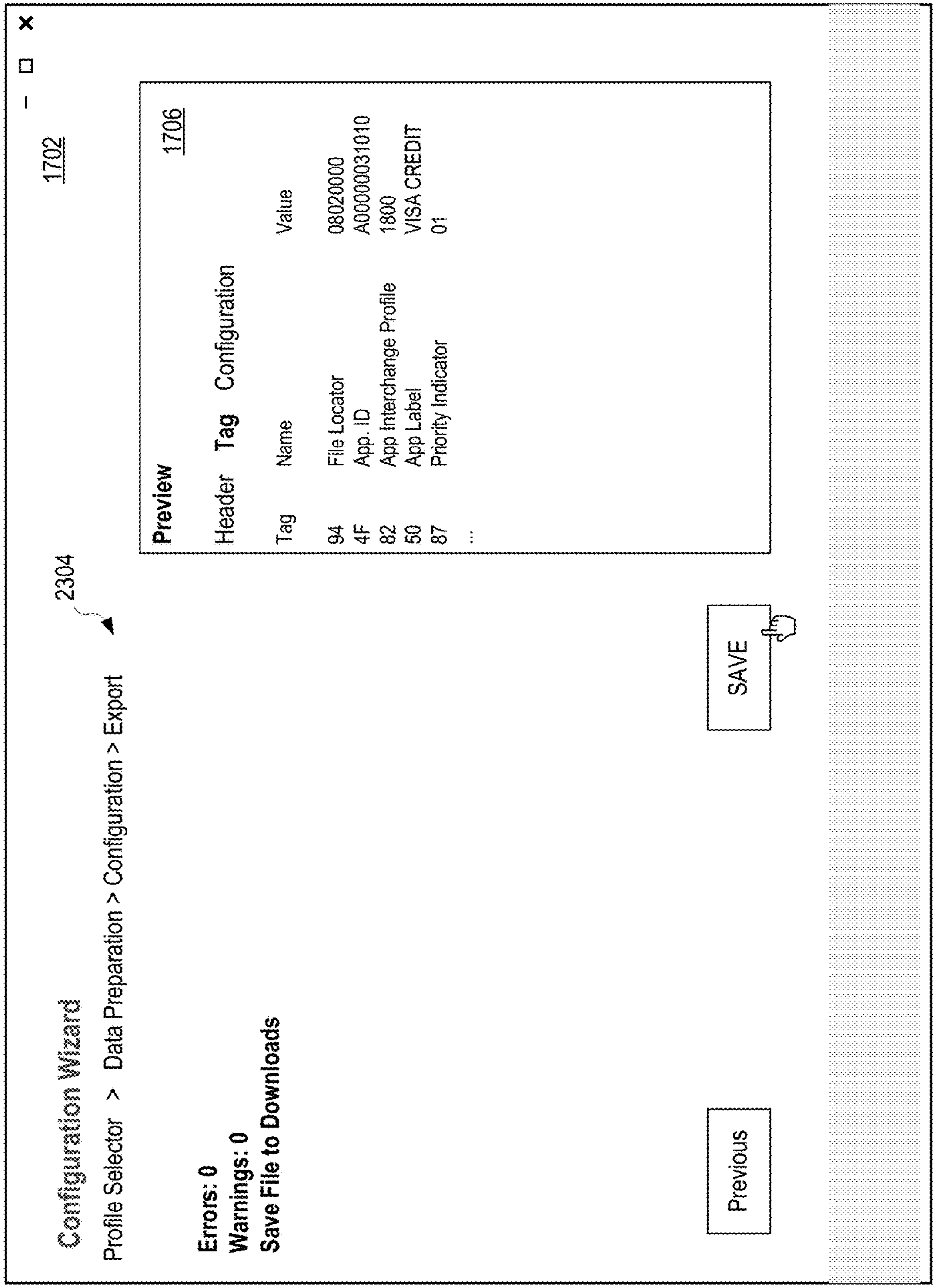
FIG. 23 illustrates an example user interface of a product wizard useable to create a card product definition, used to export the card product definition, in an example embodiment.

FIG. 22 illustrates the user interface 1700, but instead of the selectable option region 1704, a settings selection region 2204 is depicted in which additional tag values are defined. For example, an application label and language are selected in the setting selection region 2204. A user may then elect to proceed (e.g., again selecting the "next" button as depicted in FIG. 22), at which point the wizard user interface 1700 proceeds to display an export region 2304, in place of the setting for selection region 2204. The export region 2304, seen in FIG. 23, displays any errors or warnings in the configured information defined by the user, and allows the user to select a save option, which saves the card product definition, such as to a configuration file, database, or into the payment card platform 200, for ingestion as a card product 114.

Figure 24:
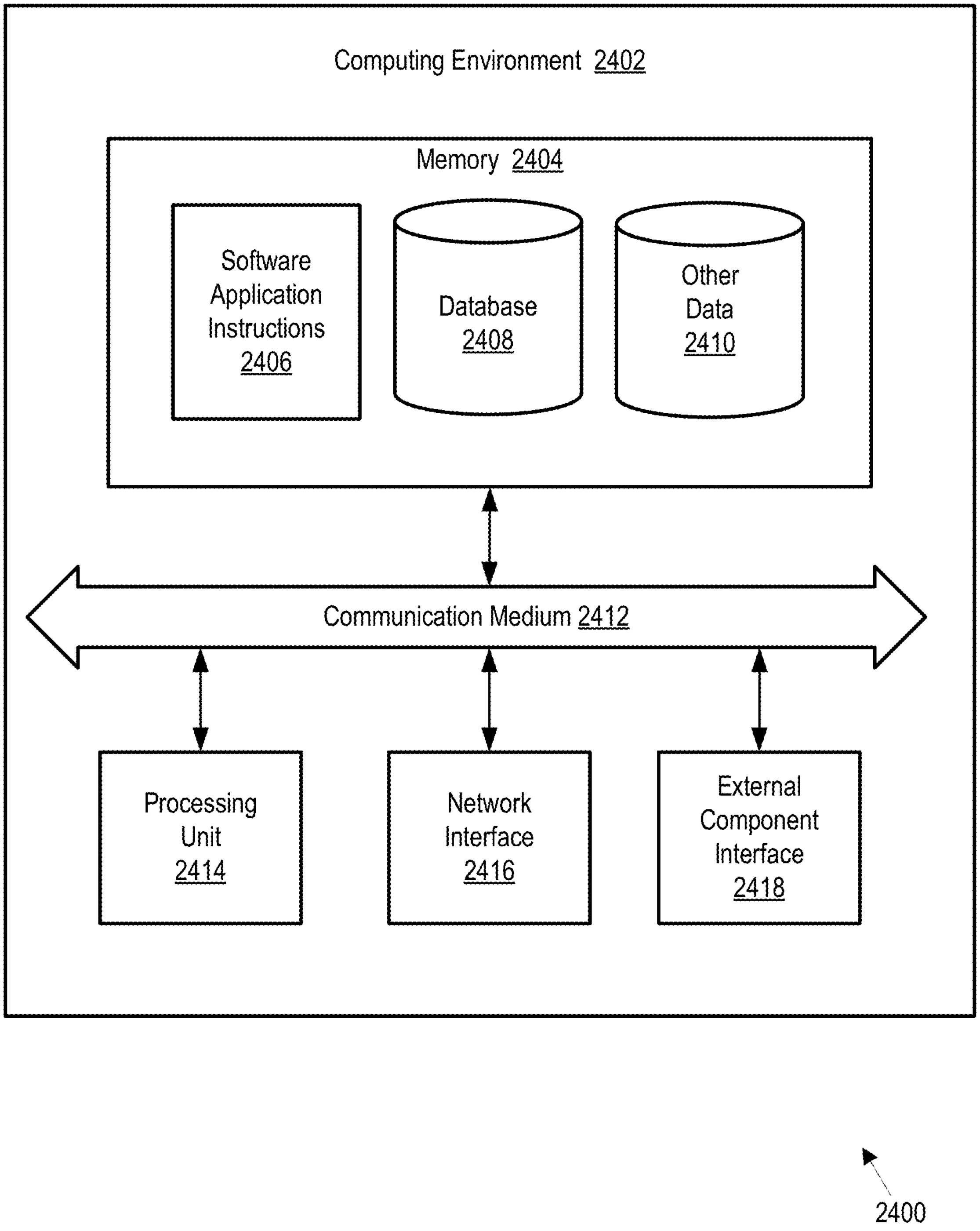
FIG. 24 is a block diagram of an example physical components of a computing device or system with which embodiments may be practiced.

FIG. 24 illustrates an example system 2400 with which disclosed systems and methods can be used. In an example, the following can be implemented in one or more systems 2400 or in one or more systems having one or more components of system 2400: the payment card data preparation system 100, or components thereof; and other aspects of the present disclosure.

In an example, the system 2400 can include a computing environment 2402. The computing environment 2402 can be a physical computing environment, a virtualized computing environment, or a combination thereof. The computing environment 2402 can include memory 2404, a communication medium 2412, one or more processing units 2414, a network interface 2416, and an external component interface 2418.

The memory 2404 can include a computer readable storage medium. The computer storage medium can be a device or article of manufacture that stores data and/or computer-executable instructions. The memory 2404 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 2404 can store various types of data and software. For example, as illustrated, the memory 2404 includes software application instructions 2406, one or more databases 2408, as well as other data 2410. The communication medium 2412 can facilitate communication among the components of the computing environment 2402. In an example, the communication medium 2412 can facilitate communication among the memory 2404, the one or more processing units 2414, the network interface 2416, and the external component interface 2418. The communication medium 2412 can be implemented in a variety of ways, including but not limited to a Peripheral Component Interface (PCI) bus, a PCI express bus accelerated graphics port (AGP) bus, a serial Advanced Technology Attachment (ATA) interconnect, a parallel ATA interconnect, a Fiber Channel interconnect, a USB bus, a Small Computing System Interface (SCSI), or another type of communications medium.

The one or more processing units 2414 can include physical or virtual units that selectively execute software instructions, such as the software application instructions 2406. In an example, the one or more processing units 2414 can be physical products comprising one or more integrated circuits. The one or more processing units 2414 can be implemented as one or more processing cores. In another example, one or more processing units 2414 are implemented as one or more separate microprocessors. In yet another example embodiment, the one or more processing units 2414 can include an application-specific integrated circuit (ASIC) that provides specific functionality. In yet another example, the one or more processing units 2414 provide specific functionality by using an ASIC and by executing computer-executable instructions.

The network interface 2416 enables the computing environment 2402 to send and receive data from a communication network. The network interface 2416 can be implemented as an Ethernet interface, a token-ring network interface, a fiber optic network interface, a wireless network interface (e.g., Wi-Fi), a Bluetooth interface, or another type of network interface.

The external component interface 2418 enables the computing environment 2402 to communicate with external devices. For example, the external component interface 2418 can be a USB interface, Thunderbolt interface, a Lightning interface, a serial port interface, a parallel port interface, a PS/2 interface, or another type of interface that enables the computing environment 2402 to communicate with external devices. In various embodiments, the external component interface 2418 enables the computing environment 2402 to communicate with various external components, such as external storage devices, input devices, speakers, modems, media player docks, other computing devices, scanners, digital cameras, and fingerprint readers.

Although illustrated as being components of a single computing environment 2402, the components of the computing environment 2402 can be spread across multiple computing environments 2402. For example, one or more of instructions or data stored on the memory 2404 may be stored partially or entirely in a separate computing environment 2402 that is accessed over a network. Depending on the size and scale of the computing environment 2402, it may be advantageous to include one or more load balancers to balance traffic across multiple physical or virtual machine nodes. Each node may be configured to be capable of running the full system 2400. The environment 2402 may include monitoring technology to determine when a node is not functioning so an appropriate action can be taken.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A payment card platform comprising:

a card production environment hosted on a computing platform comprising a processor and a memory, the memory storing instructions which, when executed, provide:

a production context useable to define one or more payment card profiles and one or more card products, wherein the production context has a plurality of selectable modes including a data preparation mode, a personalization mode, and a one-step mode;

a data preparation engine configured to receive card profile and configuration settings and a card product definition from the production context, the data preparation engine being configured to execute a plurality of rules specified by the card product to generate a prepared card product; and a personalization engine separately executable from the data preparation engine, the personalization engine being configured to receive a prepared card product and a card definition from the production context and generate one or more personalized payment cards.

2. The payment card platform of claim 1, wherein the card production environment hosts a user interface useable to define the one or more card products and the one or more card configurations.

3. The payment card platform of claim 1, wherein the user interface is further useable to define a card data preparation and personalization environment, the one or more payment card products and the one or more card configurations being associated with the card data preparation and personalization environment.

4. The payment card platform of claim 1, wherein the user interface is further useable to define one or more of an EMV chip configuration, an applet, or a Data Generation and Initialization (DGI) layout.

5. The payment card platform of claim 1, further comprising a product wizard user interface useable to create the card product definition via a plurality of sequentially-selectable guided user template options.

6. The payment card platform of claim 1, wherein the one or more personalized payment cards includes one or more physical or virtual payment cards.

7. The payment card platform of claim 1, wherein the processor comprises a plurality of processors and the memory comprises a memory subsystem including a plurality of memory devices.

8. The payment card platform of claim 1, wherein the data preparation engine is separately selectable and executable from the personalization engine to generate one or more prepared card products.

9. A payment card platform comprising:

a card production environment hosted on a computing platform comprising a processor and a memory, the memory storing instructions which, when executed, provide:

a production context useable to define one or more payment card profiles and one or more card products;

a data preparation engine configured to receive card profile and configuration settings and a card product definition from the production context, the data preparation engine being configured to execute a plurality of rules specified by the card product to generate a prepared card product; and a personalization engine separately executable from the data preparation engine, the personalization engine being configured to receive a prepared card product and a card definition from the production context and generate one or more personalized payment cards;

wherein the card product is specific to a card issuer and comprises a data object table including one or more type, length, value (TLV) entries, a plurality of rules, and one or more Data Generation and Initialization (DGI) layouts.

10. The payment card platform of claim 9, wherein the card configuration includes authentication information, communication properties, and at least one Data Generation and Initialization (DGI) layout.

11. The payment card platform of claim 10, wherein the prepared card product includes one or more data object tables and DGI Layouts, and wherein some data object values within the one or more data object tables may remain unresolved.

12. The payment card platform of claim 11, wherein the personalization engine populates any unresolved data object values based, at least in part, on the card configuration.

13. A method of producing payment cards within a card production environment, the method comprising:

receiving a card product definition at a production context within the card production environment, the card production environment hosting a user interface useable to create the card product definition;

defining a mode of operation for the production context within the card production environment, the mode of operation being selected from among a data preparation mode, a personalization mode, and a one-step mode;

performing at least one of a data preparation process or a card personalization process based on the mode of operation, wherein the data preparation process includes:

receiving cardholder data, and configuration settings and a card product definition from the production context; and executing a plurality of rules specified by the card product to generate a prepared card product;

wherein the card personalization process includes:

receiving a prepared card product and a card configuration from the production context; and generating one or more personalized payment cards.

14. The method of claim 13, wherein the mode of operation is selectably assigned to a production context via the user interface.

15. The method of claim 13, further comprising creating the card product definition in response to user selections in a product wizard user interface including a plurality of guided user screens.

16. The method of claim 15, further comprising:

presenting to a user a first plurality of selectable template options within the product wizard user interface;

in response to selection of a first template option from among the first plurality of selectable template options, presenting a second plurality of selectable template options within the product wizard user interface, the second plurality of selectable template options being determined and displayed, at least in part, based on the selected first template option;

in response to selection of a second template option from among the second plurality of selectable template options, displaying, within the product wizard user interface, previous information including one or more of header information, tag information, and configuration information; and saving a configuration in response to completion of selection of a plurality of template options including at least the first template option and the second template option, the configuration file including the header information, the tag information, and the configuration information.

17. The method of claim 16, wherein the configuration is representative of the card product definition.

18. The method of claim 15, wherein the first plurality of selectable template options, the second plurality of selectable template options, and a determination of which template options to be displayed within the product wizard user interface are defined in an editable object file accessed via the product wizard user interface.

* * * * *